US009890071B2

(12) United States Patent
Duran

(10) Patent No.: US 9,890,071 B2
(45) Date of Patent: Feb. 13, 2018

(54) ULTRALOW EXPANSION GLASS

(71) Applicant: Corning Incorporated, Corning, NY (US)

(72) Inventor: Carlos Alberto Duran, Ottawa (CA)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/291,379

(22) Filed: Oct. 12, 2016

(65) Prior Publication Data

US 2017/0029313 A1 Feb. 2, 2017

Related U.S. Application Data

(62) Division of application No. 14/474,427, filed on Sep. 2, 2014, now Pat. No. 9,505,649.

(Continued)

(51) Int. Cl.

*C03C 3/06* (2006.01)
*C03B 25/00* (2006.01)

(Continued)

(52) U.S. Cl.

CPC .............. *C03B 25/00* (2013.01); *C03B 25/02* (2013.01); *C03B 25/08* (2013.01); *C03C 3/06* (2013.01);

(Continued)

(58) Field of Classification Search

CPC .............................. C03C 3/06; C03C 2201/42

(Continued)

(56) References Cited

U.S. PATENT DOCUMENTS 5,696,038 A 12/1997 Maxon
5,970,751 A 10/1999 Maxon (Continued)

FOREIGN PATENT DOCUMENTS

EP 0 483 752 5/1992
EP 0 943 586 9/1999

(Continued)

OTHER PUBLICATIONS

International Search Report and Written Opinion of the International Searching Authority; PCT/US2014/055126; dated Dec. 12, 2014.

(Continued)

*Primary Examiner* — Noah S Wiese
(74) *Attorney, Agent, or Firm* — Kevin L. Bray

(57) ABSTRACT

Silica-titania glasses with small temperature variations in coefficient of thermal expansion over a wide range of zero-crossover temperatures and methods for making the glasses. The method includes a cooling protocol with controlled anneals over two different temperature regimes. A higher temperature controlled anneal may occur over a temperature interval from 750° C.-950° C. or a sub-interval thereof. A lower temperature controlled anneal may occur over a temperature interval from 650° C.-875° C. or a sub-interval thereof. The controlled anneals permit independent control over CTE slope and Tzc of silica-titania glasses. The independent control provides CTE slope and Tzc values for silica-titania glasses of fixed composition over ranges heretofore possible only through variations in composition.

19 Claims, 11 Drawing Sheets

Related U.S. Application Data

(60) Provisional application No. 61/877,422, filed on Sep. 13, 2013.

(51) Int. Cl.
*C03B 25/02* (2006.01)
*C03B 25/08* (2006.01)
*C03C 3/076* (2006.01)

(52) U.S. Cl.
CPC .......... *C03C 3/076* (2013.01); *C03B 2201/42* (2013.01); *C03C 2201/00* (2013.01); *C03C 2201/42* (2013.01); *Y02P 40/57* (2015.11)

(58) Field of Classification Search
USPC ............................................................ 501/54
See application file for complete search history.

(56) References Cited

U.S. PATENT DOCUMENTS

| | | | | |
|---|---|---|---|---|
| 6,988,277 | B2 | 1/2006 | Kovac | |
| 7,155,839 | B2 | 1/2007 | Schopf | |
| 7,410,922 | B2 | 8/2008 | Iwahashi | |
| RE40,586 | E | 11/2008 | Hrdina | |
| 7,935,648 | B2 | 5/2011 | Maida et al. | |
| 8,240,172 | B2 | 8/2012 | Tamitsuji | |
| 2004/0027555 | A1 | 2/2004 | Hrdina | |
| 2007/0137252 | A1 | 6/2007 | Maxon | |
| 2009/0143213 | A1 | 6/2009 | Hrdina et al. | |
| 2011/0048075 | A1 | 3/2011 | Duran et al. | |
| 2011/0052869 | A1 | 3/2011 | Hrdina et al. | |
| 2011/0207592 | A1 | 8/2011 | Duran et al. | |
| 2011/0207593 | A1 | 8/2011 | Duran et al. | |
| 2011/0301015 | A1 | 12/2011 | Mitsumori | |
| 2012/0264584 | A1* | 10/2012 | Miyasaka | B82Y 10/00 501/53 |
| 2013/0052391 | A1 | 2/2013 | Annamalai | |
| 2014/0066286 | A1* | 3/2014 | Annamalai | C03C 3/06 501/54 |

FOREIGN PATENT DOCUMENTS

| | | |
|---|---|---|
| EP | 2 463 250 | 6/2012 |
| EP | 2 468 692 | 6/2012 |
| JP | 2010084950 A | 3/2010 |
| WO | 2009116690 A1 | 9/2009 |
| WO | 2014085529 A1 | 6/2014 |

OTHER PUBLICATIONS

European Patent Application No. 17167619.0 Office Action dated Jul. 6, 2017; 7 Pages; European Patent Office.

* cited by examiner

ULTRALOW EXPANSION GLASS

This application is a divisional of U.S. patent application Ser. No. 14/474,427 filed Sep. 2, 2014, which claims the benefit of priority under 35 U.S.C. § 119 of U.S. Provisional Application Ser. No. 61/877,422 filed on Sep. 13, 2013 the content of which is relied upon and incorporated herein by reference in its entirety.

FIELD OF THE DISCLOSURE

This disclosure pertains to a glass having ultralow thermal expansion. More particularly, this disclosure relates to silica-titania glasses having a small variation in coefficient of thermal expansion over a temperature range around the zero crossover temperature. Most particularly, this disclosure relates to annealing methods that permit independent control of the temperature slope and the zero crossover temperature of the coefficient of thermal expansion of silica-titania glasses and to silica-titania glasses formed by the methods.

BACKGROUND OF THE DISCLOSURE

Mirror substrates used in projection optics systems of extreme ultraviolet lithography (EUVL) scanners must meet stringent thermal expansion requirements in order to maintain their original surface shape (known as "figure") when subjected to temperature changes caused by exposure to high power illumination during normal operation of the scanner. A temperature independent figure is necessary to avoid thermally-induced distortions in the wavefront characteristics of EUV projection optics. For this reason, the preferred material for EUVL mirror substrates is Ultra Low Expansion glass (ULE® Glass), manufactured by Corning Incorporated. Glass sold by Corning Inc. under the glass code 7973 is specifically tuned for EUVL applications. Corning EUVL glasses are characterized with high degrees of precision and accuracy to properly identify mirror substrates that are narrowly targeted to specific applications.

A defining feature of ULE® Glass is the existence of a temperature close to room temperature at which the coefficient of thermal expansion (CTE) is exactly equal to zero. This temperature is known as the crossover temperature, the zero-crossover temperature, or temperature of zero crossover of the glass and is denoted Tzc. Another important feature of ULE® glass for EUVL is that the slope of the temperature-dependent CTE curve (CTE slope) is extremely small within a temperature range close to room temperature that includes Tzc. The CTE slope of ULE® glass is in the vicinity of $1\times10^{-9}/K^2$ (or, equivalently, 1 $ppb/K^2$). EUVL mirror substrates having Tzc near the temperatures expected when the mirror substrate is exposed to an EUV optical source experience minimal thermal expansion during operation of the EUVL scanner and a small CTE slope ensures that the minimal thermal expansion is preserved if fluctuations in EUVL processing conditions cause variations in the thermal environment of the mirror substrate.

As EUVL technology advances, it is expected that higher energy optical sources will be employed to increase system productivity. The semiconductor industry is also expected to improve the efficiency of chip manufacturing processes by adopting larger wafer sizes (e.g. 450 mm), which increases duty cycle and thus the range of mirror temperature variations. The push to reduce feature size and increase device density will require scanners with higher numerical aperture (NA), which translates into an increase in the size of mirror substrates used in EUVL scanners. As the size of mirror substrates increases, the requirements for uniformity of Tzc and CTE slope will become increasingly stringent and more challenging to achieve. As EUV optical sources become more powerful and operate at new wavelengths, it will also be necessary to develop mirror substrates that maintain desirable Tzc and CTE slope characteristics over a wider range of thermal environments.

In order to meet the needs of the EUVL industry, it is desirable to develop glasses and manufacturing processes that enable control over Tzc and CTE slope. Control over Tzc and CTE slope can provide for systematic variations in Tzc and CTE slope in glass samples extracted from different parts of a boule (or other large glass monolith) so that a single boule can be used to provide all of the mirror substrates needed to accommodate the range of thermal environments experienced by EUVL mirrors at different positions within a typical EUVL scanner. Mirror substrate manufacturing efficiency can be improved if multiple substrates can be extracted from each manufactured glass boule or monolith and the Tzc or CTE slope of each mirror substrate can be adjusted to meet the specific requirements of different mirror components in an EUVL scanner.

The prior art teaches that control of the fictive temperature, Tf, of ULE® Glass can be used to tune Tzc within a narrow range while simultaneously reducing CTE slope. A shortcoming of the prior art, however, is that control of the single parameter Tf simultaneously varies both Tzc and CTE slope. In the methods of the prior art, Tzc and CTE slope are coupled and cannot be independently tuned. As a result, the glass manufacturer has been forced to finely tune the glass forming process to yield a glass composition such that, once Tf is controlled to a certain value, both CTE slope and Tzc will be within the range required by the target application. Mirror substrates produced by prior art methods are therefore usable only within a narrow range of operating conditions within an EUVL scanner. To enlarge the range of operating conditions using prior art processing methods, it is necessary to prepare multiple glass boules or monoliths that differ in glass composition. Relying on compositional variations to meet the needs of EUVL technology is inconvenient, costly, and time consuming. There is a need for new processing methods that permit independent control of Tzc and CTE slope for a given glass composition over a wide range of values.

SUMMARY

The present disclosure provides glass articles and methods for making glass articles. The glass articles may include silica-titania glass of a given composition and may exhibit Tzc and/or CTE slope values heretofore not possible for the composition. In prior art silica-titania glasses, a close correlation exists between Tzc and CTE slope for glasses of a given composition such that the range of Tzc values for a given CTE slope value (or the range of CTE slope values for a given Tzc value) is narrow. In order to operate outside of the narrow ranges of the prior art, it is necessary to modify the composition of the glass and to endure the added time, cost, and complexity associated with fabricating multiple boules. For silica-titania glasses of a given composition in accordance with the present disclosure, Tzc and CTE slope are not closely correlated and may be varied independently over a wide range to obtain glasses that feature new properties and suitability for an expanded range of applications.

The methods of the present disclosure may include annealing a silica-titania glass article. The annealing may include controlled anneals over two or more temperature regimes. The two or more temperature regimes may include a higher temperature regime and a lower temperature regime. The higher and lower temperature regimes may be consecutive. The higher temperature regime may include temperatures above 750° C., such as temperatures in the range from 750° C. to 950° C., and the lower temperature regime may include temperatures between 650° C. and the lowest temperature of the higher temperature regime. The rate of cooling in the lower temperature regime may be faster than the rate of cooling in the higher temperature regime. The method may further include cooling below the lowest temperature of the lower temperature regime.

The methods of the present disclosure may transform an initial glass article to a finished glass article. The glass article may include titania-silica glass. The titania-silica glass may have a titania content in the range from 5 wt % to 12 wt %, or in the range from 7 wt % to 12 wt %, or in the range from 6 wt % to 10 wt %, or in the range from 7.5 wt % to 9 wt %. Additionally, the titania-silica glass may typically include OH in the range from 700 ppm to 1000 ppm by weight, or in an amount of about 850 ppm. The present invention also applies to higher or lower OH-containing silica-titania glasses, for which the relevant temperature ranges may need to be appropriately adjusted within the scope of the present invention. These adjustments are required due to the effect of OH content on the structural relaxation properties of the glass. Lower OH content generally results in a slower relaxing glass, and will require temperature ranges to be adjusted to higher values. Inclusion of further dopants in the glass can have similar effects, and will also require adjustments to temperature ranges and cooling rates without departing from the scope of the present invention.

The zero-crossover temperature of the finished glass article may differ from the zero-crossover temperature of the initial glass article, while the CTE slope of the finished glass article may or may not differ from the CTE slope of the initial glass article. Alternatively, the CTE slope of the finished glass article may differ from the CTE slope of the initial glass article, while the zero-crossover temperature of the finished glass article may or may not differ from the zero-crossover temperature of the initial glass article. It is worthwhile to note that CTE slope depends on temperature. For the sake of clarity and consistency, we will refer to the CTE slope at a fixed temperature of 20° C. and we will denote this quantity by $\alpha'$ or just "CTE slope". This does not restrict the scope of the invention, as any other convenient temperature could be chosen as a basis for comparison of the CTE slope. As EUV light sources become brighter and temperatures within EUVL scanners move to higher values, it may become convenient to choose a higher temperature as a reference for measuring changes in CTE slope, without departing from the spirit of the present invention.

The zero-crossover temperature of the finished glass article may differ from the zero-crossover temperature of the initial glass article by at least 2° C., or at least 5° C., or at least 8° C., or at least 12° C., or at least 16° C., or at least 20° C.

The CTE slope of the finished glass article may differ from the CTE slope of the initial glass article by at least 0.05 ppb/$K^2$, or at least 0.10 ppb/$K^2$, or at least 0.15 ppb/$K^2$, or at least 0.20 ppb/$K^2$, or at least 0.25 ppb/$K^2$.

The zero-crossover temperature of the finished glass article may differ from the zero-crossover temperature of the initial glass article by at least 2° C., or at least 5° C., or at least 8° C., or at least 12° C., or at least 16° C., or at least 20° C. and the CTE slope of the finished glass article may differ from the CTE slope of the initial glass article by less than 0.10 ppb/$K^2$, or less than 0.07 ppb/$K^2$, or less than 0.05 ppb/$K^2$, or less than 0.03 ppb/$K^2$.

The CTE slope of the finished glass article may differ from the CTE slope of the initial glass article by at least 0.05 ppb/$K^2$, or at least 0.10 ppb/$K^2$, or at least 0.15 ppb/$K^2$, or at least 0.20 ppb/$K^2$ and the zero-crossover temperature of the finished glass article may differ from the initial zero-crossover temperature by less than 20° C., or less than 15° C., or less than 10° C., or less than 5° C., or less than 3° C., or less than 1° C.

Among the methods of the present disclosure is:

A method of annealing glass comprising:

providing a silica-titania glass article, said silica-titania glass article having a first Tzc and a first CTE slope at 20° C.;

heating said glass article to a first temperature, said first temperature being in the range from 875° C. to 975° C.;

cooling said glass article at a first rate from said first temperature to a second temperature, said second temperature being in the range from 750° C. to 875° C.;

cooling said glass article at a second rate from said second temperature to a third temperature, said second rate exceeding said first rate, said third temperature being in the range from 650° C. to 775° C.; and cooling said glass article at a third rate below said third temperature, said third rate exceeding said second rate, said cooling at said third rate producing a finished silica-titania glass article, said finished silica-titania glass article having a second Tzc and a second CTE slope at 20° C., said second Tzc differing from said first Tzc.

Among the methods of the present disclosure is:

A method of annealing glass comprising:

providing a silica-titania glass article, said silica-titania glass article having a first fictive temperature and a first Tzc;

heating said glass article to a first temperature, said first temperature being in the range from 60° C. below said first fictive temperature to 10° C. below said first fictive temperature, said heating excluding exposing said glass article to a temperature greater than said first fictive temperature;

cooling said glass article at a first rate from said first temperature to a second temperature, said second temperature being at least 25° C. less than said first temperature;

cooling said glass article at a second rate to a third temperature, said third temperature being at least 50° C. less than said second temperature, said second rate exceeding said first rate, said cooling producing a finished silica-titania glass article, said finished silica-titania glass article having a second fictive temperature and a second Tzc, said second fictive temperature differing from said first fictive temperature by less than 10° C., said second Tzc differing from said first Tzc by at least 0.5° C.

The present disclosure extends to a silica-titania glass having a titania content between 7.45 wt % and less than 7.95 wt %, said glass having Tzc=25° C. and a CTE slope at 20° C. below 1.30 ppb/$K^2$. The glass may include an OH concentration in the range from 700 ppm to 1000 ppm, or an OH concentration of about 850 ppm.

The present disclosure extends to a silica-titania glass having a titania content between 7.62 wt % and less than 8.13 wt %, said glass having Tzc=35° C. and a CTE slope at 20° C. below 1.30 ppb/$K^2$. The glass may include an OH concentration in the range from 700 ppm to 1000 ppm, or an OH concentration of about 850 ppm.

The present disclosure extends to a silica-titania glass having a titania content between 7.56 wt % and less than 8.07 wt %, said glass having Tzc=25° C. and a CTE slope at 20° C. below 1.25 ppb/$K^2$. The glass may include an OH concentration in the range from 700 ppm to 1000 ppm, or an OH concentration of about 850 ppm.

The present disclosure extends to a silica-titania glass having a titania content between 7.72 wt % and less than 8.23 wt %, said glass having Tzc=35° C. and a CTE slope at 20° C. below 1.25 ppb/$K^2$. The glass may include an OH concentration in the range from 700 ppm to 1000 ppm, or an OH concentration of about 850 ppm.

The present disclosure extends to a silica-titania glass having a titania content in the range from 7.72 wt % to less than 8.03 wt %, said glass having Tzc in the range from 25° C. to 35° C. and a CTE slope at 20° C. of less than 1.30 ppb/$K^2$. The glass may include an OH concentration in the range from 700 ppm to 1000 ppm, or an OH concentration of about 850 ppm.

The present disclosure extends to a silica-titania glass having a titania content between 7.65 wt % and less than 7.95 wt %, said glass having Tzc=25° C. and a CTE slope at 20° C. below 1.30 ppb/$K^2$. The glass may include an OH concentration in the range from 700 ppm to 1000 ppm, or an OH concentration of about 850 ppm.

The present disclosure extends to a silica-titania glass having a titania content between 7.82 wt % and less than 8.13 wt %, said glass having Tzc=35° C. and a CTE slope at 20° C. below 1.30 ppb/$K^2$. The glass may include an OH concentration in the range from 700 ppm to 1000 ppm, or an OH concentration of about 850 ppm.

The present disclosure extends to a silica-titania glass having a titania content between 7.76 wt % and less than 8.07 wt %, said glass having Tzc=25° C. and a CTE slope at 20° C. below 1.25 ppb/$K^2$. The glass may include an OH concentration in the range from 700 ppm to 1000 ppm, or an OH concentration of about 850 ppm.

The present disclosure extends to a silica-titania glass having a titania content between 7.92 wt % and less than 8.23 wt %, said glass having Tzc=35° C. and a CTE slope at 20° C. below 1.25 ppb/$K^2$. The glass may include an OH concentration in the range from 700 ppm to 1000 ppm, or an OH concentration of about 850 ppm.

The present disclosure extends to a silica-titania glass having a titania content in the range from 7.92 wt % to less than 8.03 wt %, said glass having Tzc in the range from 25° C. to 35° C. and a CTE slope at 20° C. of less than 1.30 ppb/$K^2$. The glass may include an OH concentration in the range from 700 ppm to 1000 ppm, or an OH concentration of about 850 ppm.

The present disclosure extends to a silica-titania glass having a titania content in the range from 7.45 wt % to less than 8.23 wt %, said glass having Tzc in the range from 25° C. to 35° C. and a CTE slope at 20° C. of less than 1.30 ppb/$K^2$. The glass may include an OH concentration in the range from 700 ppm to 1000 ppm, or an OH concentration of about 850 ppm.

The present disclosure extends to a silica-titania glass having a titania content in the range from 7.45 wt % to less than 8.39 wt %, said glass having Tzc in the range from 15° C. to 45° C. and a CTE slope at 20° C. of less than 1.30 ppb/$K^2$. The glass may include an OH concentration in the range from 700 ppm to 1000 ppm, or an OH concentration of about 850 ppm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
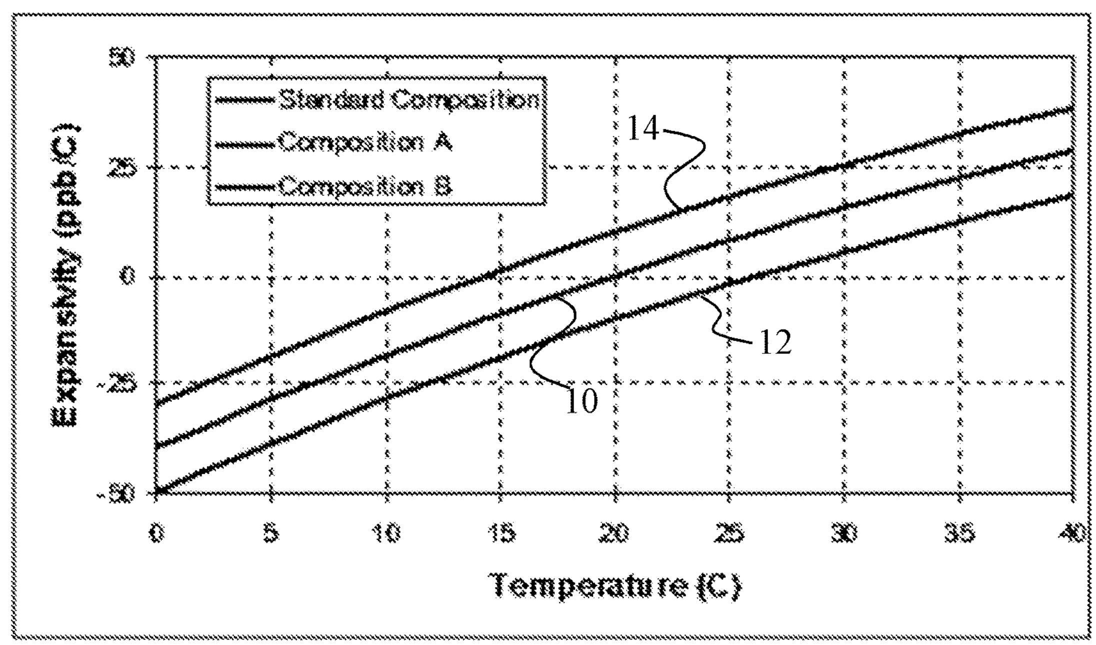
FIG. 1 depicts the coefficient of thermal expansion (expansivity) as a function of temperature for three silica-titania glass compositions.

The present disclosure provides a method of processing glasses that provides independent control over the zero-crossover temperature (Tzc) and temperature slope of the coefficient of thermal expansion (CTE slope) of glasses of a fixed composition. The present disclosure further provides glasses produced by the methods.

The terms “article” or “glass article” shall be used herein to refer to an object or component made from glass. The glass article may be a boule, a blank, a sheet, a lump, or other glass configuration of any physical dimensions. The glass article may include titania-silica glass. The titania-silica glass may have a titania content in the range from 5 wt % to 12 wt %, or in the range from 7 wt % to 12 wt %, or in the range from 6 wt % to 10 wt %, or in the range from 7.5 wt % to 9 wt %. The glass article may be formed directly by any method known in the art or it may be formed by consolidation of a glass preform made by any method known in the art. Silica-titania glass compositions are most commonly used in EUVL systems and will be emphasized herein for purposes of illustration. The methods of the present disclosure, however, are more general and extend to glasses of any compositions, including silica-titania glasses containing OH, fluorine, chlorine or other dopants.

The silica and titania precursors used to make a silica-titania glass may be any silicon and titanium halide or organometallic compound known in the art as useful for making such glass, or mixtures thereof. The CTE slope and Tzc of glass articles made from silica-titania glass may be tuned using the methods described herein. ULE® glass by Corning Incorporated may be used herein, without limitation, as an exemplary silica-titania glass and may be referred to herein as ULE glass or silica-titania glass.

Representative methods of making silica-titania glass are described in U.S. Pat. Nos. 5,696,038, 5,970,751, 6,988,277, 7,155,936, RE 40586, 7,410,922, and U.S. Patent Application Publication Nos. 2004/0027555, 2007/0137252 and 2009/0143213, the disclosure of all of which are incorporated herein by reference. For example, U.S. Pat. No. 5,970,751 describes a method and apparatus for preparing fused silica-titania glass. The apparatus includes a stationary cup or vessel. U.S. Pat. No. 5,696,038 describes using oscillation/rotation patterns for improving off-axis homogeneity in fused silica boules using a prior art rotating cup as described therein. U.S. Pat. No. 7,410,922 describes preparing a silica-titania glass by deposition of silica-titania particles on a target such as a quartz rod or plate, and heating the deposited particles to a vitrification temperature to obtain a silica-titania glass body. U.S. Patent Application Publication No. 2004/0027555 describes a method for producing low expansion, titania-containing silica glass bodies by depositing titania-containing glass soot and consolidating it to form a silica-titania glass body, and further describes the lessening of striae by increasing the number of vents or exhaust ports of the furnace.

The semiconductor industry produces the silicon chips that have fueled the information revolution that has occurred over the past few decades. The success of the semiconductor industry can be attributed to continuous improvements in the performance of semiconductor chips and continued reductions in manufacturing costs. Performance improvements and cost reductions have been achieved primarily through miniaturization of chips and devices and miniaturization has been made possible through increases in the optical resolution of lithography scanners. Since lithographic feature size correlates with the wavelength of the optical source, there has been a strong demand to decrease the operating wavelength of scanners in lithographic systems. The practical resolution limit achievable using traditional, refractive optics has been reached at the current lithographic wavelength of ~193 nm (ArF excimer lasers). Current ArF scanners are now reaching their minimum practical feature size.

In order to decrease feature size and increase device density beyond the limits of ArF scanners, the industry needs to find a new technology. The most promising emerging technology is extreme ultraviolet lithography (EUVL). Several pilot-line EUVL tools are currently in operation and chip production using EUVL is expected to begin soon in the near future. A key difference between current, pilot-line and production-scale EUVL tools is the much higher light source intensity required for production scale to fulfill throughput requirements. Future-generation EUVL tools are likely to intensify the trend toward high intensity, high energy EUV light sources to maximize manufacturing productivity and resolution.

EUVL is similar to current optical lithography in that it relies on an optical projection system to reproduce features from a master reticle (also known as mask) onto a thin photosensitive layer (resist) deposited on the surface of a semiconductor wafer. EUVL operates at a wavelength of ~13.4 nm, a wavelength at which no known material is transparent. Thus, EUVL projection systems utilize reflective components (mirrors) rather than refractive elements (lenses). The extremely short wavelength of the EUV radiation poses a number of challenges to the design of EUVL systems. Reflective coatings on the mirrors, for example, are fundamentally limited to ~70% efficiency, which means that ~30% of EUV source radiation is lost at each reflective surface in the scanner. The lost radiation is absorbed as heat by the mirror substrate. Heat absorption by the mirror substrate is undesirable because it may cause thermal expansions or contractions of the substrate, which may deform or alter the reflective coating and lead to distortions in the wavefront of the reflected EUV radiation. Wavefront distortions, in turn, may lead to deterioration in the resolution of the EUVL system. Additionally, since gases absorb 13.4 nm radiation, EUVL systems must operate under an internal vacuum. Vacuum conditions make it more difficult to remove heat from the mirrors and exacerbate the problem of mirror heating.

Concerns over thermal effects associated with EUVL systems have prompted extremely tight requirements for the materials used to make the mirror substrates. Silica-titania glass, such as ULE® glass, is presently the material of choice for mirror substrates in EUVL projection systems. ULE® glass has an extremely low coefficient of thermal expansion (CTE) at room temperature, which is critical in allowing the shape of the mirror to remain substantially constant upon heating. ULE® glass also features low striae (which enables the production of very precise mirror surfaces), long term chemical and dimensional stability, and compatibility with a vacuum environment.

Specifications for EUVL projection systems require Tzc of mirror substrates to be within a very narrow range and to be highly uniform spatially. Precise control over the composition of silica-titania mirror substrates is needed to achieve Tzc values within a narrow target range. In order to maintain spatial uniformity of Tzc, uniformity in the composition across the dimensions of the mirror substrates is needed. Spatial uniformity in composition will become increasingly challenging as the semiconductor industry continues the trend toward smaller feature sizes. Smaller feature sizes require mirrors with higher numerical aperture, which necessitates the use of larger mirrors. The need for larger mirrors in EUVL projection systems requires compositional uniformity over increasingly larger mirror substrates. In practice, it is becoming more difficult to reliably produce glass boules with the precision and uniformity in composition over the larger areas needed to meet the specification expected for EUVL mirror substrates.

It is further recognized that different mirrors in EUVL projection systems are subject to different thermal environments so that mirror substrates having a range of Tzc values are needed to fully equip an EUVL system. In principle, a series of boules with different compositions could be used in the formation of mirror substrates spanning a range of Tzc values. FIG. 1, for example, illustrates the variation of the coefficient of thermal expansion CTE (which may also be referred to herein as "expansivity") with temperature for three silica-titania glasses. Trace 10 shows the variation for a glass article having a standard glass composition (7.5 wt % titania and 92.5 wt % silica). Trace 12 shows the variation for a glass article having composition B (>7.5 wt % titania and <92.5 wt % silica). Trace 14 shows the variation for a glass article having composition A (<7.5 wt % titania and >92.5 wt % silica). Tzc corresponds to the temperature at which the expansivity is equal to zero (~14° C. for composition A, ~20° C. for the standard composition, and ~26° C. for composition B). Although the data indicate that Tzc can be controlled by varying the titania content of the glass, it is expensive and inconvenient in practice to prepare multiple boules differing in titania content to achieve mirror substrates with different values of Tzc.

From a process efficiency standpoint, it is preferable to fabricate the full set of mirror substrates needed for an EUVL system from boules of the same composition. It is more convenient to develop a standardized manufacturing process for producing boules of a single composition in high volume than it is to develop multiple processes for producing boules of varying composition. Boules of a fixed composition that are produced in a high volume process can be screened after production for suitability for a particular thermal environment within an EUVL system and can be subjected to post-production annealing treatments to adjust properties to optimize suitability for a particular application. Once the boule is optimized, it can be cut to produce multiple blanks having uniform characteristics that are customized for a particular application. Different boules can be subjected to different post-production treatments to obtain blanks optimized for different thermal environments within an EUVL system or different applications. Alternatively, blanks cut from a particular boule can be subjected to different annealing treatments to produce a series of mirror substrates from the same boule, each of which is optimized for a different application. In order for a high volume manufacturing process based on a single composition to succeed, post-production annealing processes capable of tuning the properties of the boule over a wide range must be available. As described more fully hereinbelow, the tunability available from conventional annealing processes is limited and inadequate for adjusting boule characteristics over a range sufficient for practical applications. The present disclosure remedies this deficiency by providing annealing processes that significantly enlarge the degree of tunability of boule properties.

In addition to Tzc, specifications for mirror substrates require a target value of CTE slope and spatial uniformity of CTE slope across the glass article. CTE slope is a measure of the sensitivity of CTE with temperature and is given by the tangent slope of data curves such as the traces shown in FIG. 1. CTE slope may be defined more generally as the rate of change of CTE with temperature. It is generally desired to have a small CTE slope.

The methods described herein may include cooling a glass article at a specified rate from one temperature to a different temperature. As used herein, the terms “cooling rate”, “rate of cooling”, “cooling at a rate of . . . ” and the like refer to an average cooling rate. The average cooling rate may apply between two specified temperatures or below a single specified temperature. As used herein, the term “CTE slope” refers to CTE slope at a temperature of 20° C.

In the fabrication of ULE® glass, the glass is formed in a high temperature furnace and machined to form a boule or other glass article. The glass article is then subjected to a standard initial annealing process to relieve residual internal stresses and to promote spatial uniformity of glass properties. The conditions of the standard ULE® annealing process are:

ramping the temperature from 25° C. to 990° C. at a rate of 50° C./hour;

holding the temperature at 990° C. for 10 hours;

after the 10-hour hold, lowering the temperature from 990° C. to 850° C. at a rate of 3° C./hour; and lowering the temperature from 850° C. to 25° C. at a rate of 25° C./hour.

The standard initial anneal establishes an initial fictive temperature Tf,0 and an initial CTE slope of the silica-titania glass that fall within narrow ranges. Greater variability, however, is observed in the initial zero-crossover temperature Tzc,0 of the silica-titania glass due to non-uniformities in spatial concentration of titania in the glass. The CTE slope of the silica-titania glass following the standard initial anneal is greater than the target value desired for EUVL mirror substrates. To reduce CTE slope to the target range, the prior art discloses subjecting the silica-titania glass to a secondary anneal after completion of the standard initial anneal associated with conventional fabrication. The objective of the secondary anneal is to shift the fictive temperature of the silica-titania glass to a temperature low enough to obtain a CTE slope in the target range.

Figure 2:
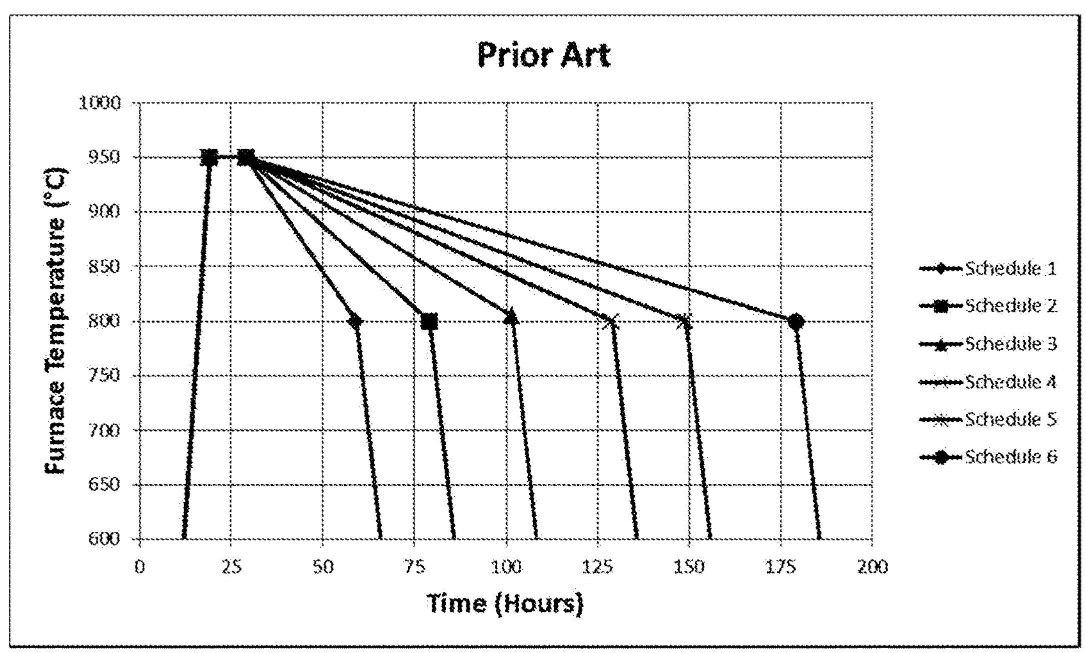
FIG. 2 depicts prior art annealing schedules used to adjust the fictive temperature of silica-titania glasses.

Typical temperature schedules disclosed in the prior art for the secondary anneal are shown in FIG. 2. The glass article is heated to an elevated temperature, held at that temperature for several hours, cooled at slower rate to an intermediate temperature, and cooled from the intermediate temperature at a faster rate to a final temperature (usually room temperature). The elevated temperature is a temperature above the initial fictive temperature Tf,0 obtained in the standard initial anneal. In FIG. 2, the elevated temperature is 950° C. The intermediate temperature is a temperature below the minimum fictive temperature achievable for the glass with annealing schedules with duration of up to a few weeks. The expectation in the prior art is that cooling at the slower rate to temperatures much below the expected minimum fictive temperature has only a minimal effect on the properties of the glass and serves only to unduly lengthen the process by delaying the onset of the rapid cooling step. The intermediate temperature in FIG. 2 is 800° C. The rate of cooling from the elevated temperature to the intermediate temperature is known in the art to determine the reduction in fictive temperature from the initial fictive temperature Tf,0. Faster cooling rates provide higher fictive temperatures than slower cooling rates. The cooling rate from the elevated temperature to the intermediate temperature is highest for annealing schedule 1 in FIG. 2 and continually decreases over annealing schedules 2-6. A glass article subjected to annealing schedule 1 has a higher fictive temperature than a glass article of the same composition subjected to annealing schedule 2, a glass article subjected to annealing schedule 2 has a higher fictive temperature than a glass article subjected to annealing schedule 3 etc. After cooling to the intermediate temperature, the glass articles are subjected to a rapid cooling step. The rapid cooling step in the prior art annealing schedules occurs at a standard rate and variability in the prior art annealing schedules occurs only in the rate of cooling between the elevated temperature and the intermediate temperature. In the prior art, the only considerations given to the rate of cooling of the final rapid cooling step to room temperature is that it is quick enough to stop further evolution of Tf, and compatible with preserving the integrity of the glass body and equipment.

Figure 3:
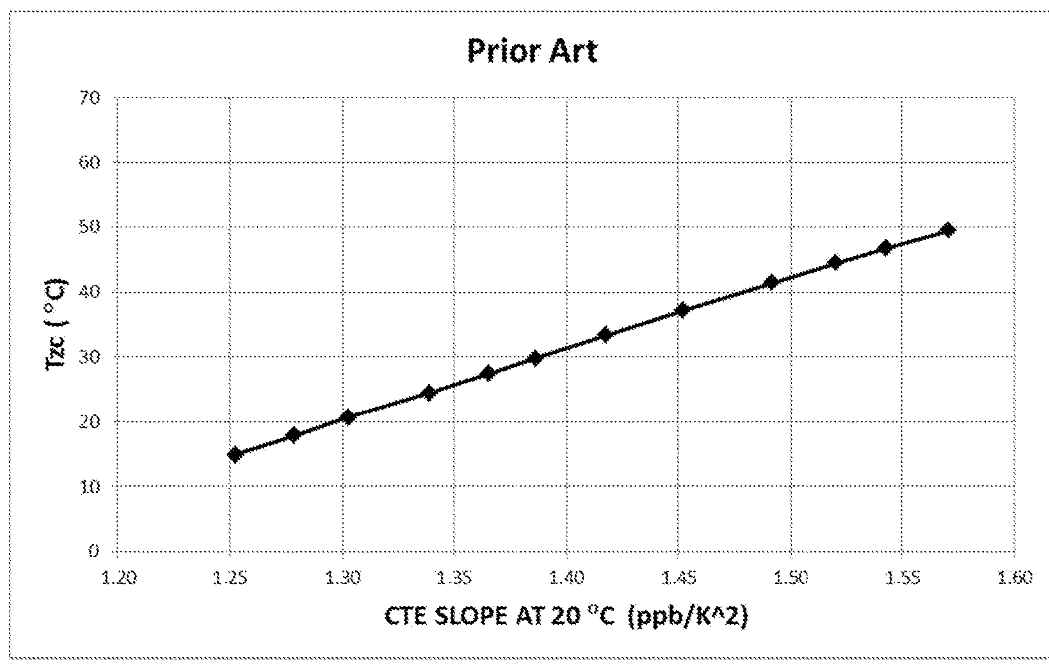
FIG. 3 shows a relationship between zero-crossover temperature (Tzc) and CTE slope for silica-titania glasses subjected to prior art annealing schedules.

The variation in fictive temperature resulting from variation in the rate of cooling between the elevated and intermediate temperatures in the prior art secondary annealing process leads to variations in CTE slope and Tzc. FIG. 3 shows a calculated relationship between Tzc and CTE slope for a silica-titania glass having the approximate composition by weight: 7.9% $TiO_2$, ~92.0% $SiO_2$ and 850 ppm OH. Unless otherwise noted, an OH content of ~850 ppm is assumed in the examples discussed below. Each data point shown in FIG. 3 corresponds to the silica-titania glass after it had been subject to a secondary anneal of the prior art of the type shown in FIG. 2. The different data points correspond to different rates of cooling from the elevated temperature (950° C.) to the intermediate temperature (800° C.). The other steps of the secondary anneal were identical for each of the data points. Tzc and CTE slope were computed for the annealing treatment corresponding to each data point for the glass composition. Both CTE slope and Tzc were observed to increase as the cooling rate from the elevated temperature (950° C.) to the intermediate temperature (800° C.) was increased. Data points aligned from left to right in FIG. 3 correspond to samples of the silica-titania glass of fixed composition that were cooled at progressively increasing rates from the elevated temperature (950° C.) to the intermediate temperature (800° C.).

The veracity of the calculation used to determine the data points shown in FIG. 3 was confirmed through measurements of selected points along the curve. Further confirmation was obtained through measurements performed on glass of different compositions. Glasses with different compositions have different initial Tzc values following the standard initial anneal, but can be compared by plotting the change in Tzc induced by secondary anneals of the prior art that utilize different cooling rates as a function of CTE slope. The results of such measurements provide a plot consistent with the trend shown in FIG. 3.

Although the data in FIG. 3 indicate that both Tzc and CTE slope can be varied using the secondary annealing process of the prior art, it is not possible to vary Tzc and CTE slope independently using the methods of the prior art. Instead, Tzc and CTE slope are correlated such that any adjustment in fictive temperature resulting from cooling between the elevated and intermediate temperatures in the prior art predetermines both Tzc and CTE slope. A particular change in CTE slope, for example, is necessarily accompanied by a particular change in Tzc such that a 1:1 correspondence between CTE slope and Tzc results from the prior art secondary anneal. The data shown in FIG. 3 exemplify the correlation between CTE slope and Tzc.

Instead of correlated CTE slope and Tzc values for a glass of a given composition, it would be desirable to develop an annealing process that permits independent variation of CTE slope and Tzc. In the data shown in FIG. 3, for example, a silica (92.0 wt %)-titania (7.9 wt %) glass suitable for an application requiring Tzc=50° C. necessarily has a CTE slope of about 1.57 ppb/$K^2$ at 20° C. This value of CTE slope may be too high for the intended application and may disqualify the glass from consideration. In order to achieve a low CTE slope, the correlation of FIG. 3 indicates that a glass subject to a secondary anneal of the prior art necessarily has a low Tzc. With the prior art secondary anneal, a glass of a given composition having both a high Tzc and low CTE slope is not possible.

The present disclosure provides a method of annealing glasses that permits independent control over Tzc and CTE slope. The present disclosure recognizes a deficiency in the prior art secondary annealing process. Specifically, the present disclosure recognizes that controlled cooling below the intermediate temperature of the prior art secondary anneal influences the characteristics of the glass. The consistent intermediate temperature and consistent rapid cooling performed below the intermediate temperature in the prior art secondary anneal (as shown in FIG. 2) is believed to be responsible for the correlation of Tzc and CTE slope depicted in FIG. 3. By varying the intermediate temperature and replacing the rapid cooling below the intermediate temperature with a slower, controlled cooling below the intermediate temperature to an annealing endpoint temperature that is well below the intermediate temperature associated with the prior art secondary anneal, the present disclosure enables independent control of Tzc and CTE slope.

The method of the present disclosure includes subjecting a glass article to an annealing protocol that includes controlled anneals over two different temperature intervals. The glass article may be or include a glass that has previously been subjected to an initial anneal, such as the standard initial anneal described hereinabove, during initial fabrication. The Tzc and CTE slope of the glass after fabrication and completion of the initial anneal may be referred to herein as the initial Tzc (or Tzc,0) and the initial CTE slope (or α',0), respectively. The glass may be a silica-titania glass. In the present method, a first controlled anneal occurs over a higher temperature interval than a second controlled anneal. As described more fully hereinbelow, the CTE slope of the glass article is determined primarily by the higher temperature controlled anneal. Although Tzc of the glass article is primarily influenced by the higher temperature controlled anneal, it can be varied independently of CTE slope by the lower temperature controlled anneal. Through control of the temperature window, rate of cooling and annealing time of the higher and lower temperature controlled anneals, the present method enables independent control over CTE slope and Tzc to permit precise control over CTE slope and Tzc over a wider range of values than is available from prior art annealing protocols.

The first controlled anneal occurs from an elevated temperature to an intermediate temperature. The elevated and intermediate temperatures may be the same or different than the elevated and intermediate temperatures described hereinabove in connection with the secondary anneal of the prior art. The elevated temperature is a temperature near or above the fictive temperature of the glass article undergoing the controlled anneal. The first controlled anneal may adjust the fictive temperature to a higher or lower temperature. For a silica-titania glass article, the elevated temperature may be a temperature of at least 850° C., or at least 875° C., or at least 900° C., or at least 925° C., or at least 950° C., or at least 975° C. or a temperature between 875° C. and 975° C., or a temperature between 900° C. and 950° C.

The intermediate temperature is a temperature less than the elevated temperature. The intermediate temperature may be less than or equal to the ultimate fictive temperature of the glass article following completion of the anneal of the present disclosure. For a silica-titania glass article, the intermediate temperature may be a temperature of at least 750° C., or at least 775° C., or at least 800° C., or at least 825° C., or at least 850° C. or at least 875° C., or a temperature between 750° C. and 875° C., or a temperature between 775° C. and 875° C., or a temperature between 800° C. and 850° C.

The rate of cooling from the elevated temperature to the intermediate temperature may be less than 10.0° C./hr, or less than 7.5° C./hr, or less than 5.0° C./hr, or less than 2.5° C./hr, or less than 1.0° C./hr, or less than 0.75° C./hr, or less than 0.5° C./hr, or less than 0.25° C./hr, or less than 0.10° C./hr, or between 0.01° C./hr and 10.0° C./hr, or between 0.01° C./hr and 5.0° C./hr, or between 0.10° C./hr and 7.5° C./hr, or between 0.10° C./hr and 5.0° C./hr or between 0.25° C./hr and 5.0° C./hr, or between 0.50° C./hr and 5.0° C./hr.

The second controlled anneal occurs from the intermediate temperature to an annealing endpoint temperature. The annealing endpoint temperature is less than the intermediate temperature and greater than room temperature. The annealing endpoint temperature may be a temperature of at least 650° C., or at least 675° C., or at least 700° C., or at least 725° C., or at least 750° C. or at least 775° C., or a temperature between 650° C. and 775° C., or a temperature between 675° C. and 775° C., or a temperature between 675° C. and 750° C., or a temperature between 700° C. and 750° C., or a temperature between 675° C. and 725° C.

The rate of cooling from the intermediate temperature to the annealing endpoint temperature may be less than 300° C./hr, or less than 200° C./hr, or less than 100° C./hr, or less than 50° C./hr, or less than 25° C./hr, or less than 10° C./hr, or less than 5° C./hr, or less than 1° C./hr, or less than 0.5° C./hr, or less, or between 0.1° C./hr and 300° C./hr, or between 0.5° C./hr and 100° C./hr, or between 1.0° C./hr and 50° C./hr, or between 2.0° C./hr and 25° C./hr, or between 2.0° C./hr and 20° C./hr, or between 2.0° C./hr and 15° C./hr, or between 2.0° C./hr and 10° C./hr.

After cooling to the annealing endpoint temperature, the glass article may be further cooled to a final temperature less than the annealing endpoint temperature to produce a finished glass article. The final temperature may be room temperature. The rate of cooling from the annealing endpoint temperature to the final temperature is arbitrary and may be greater than the rate of cooling during the first controlled anneal and the rate of cooling during the second controlled anneal.

The examples presented hereinbelow demonstrate that controlled anneals over the higher and lower temperature windows of the present method permit independent control over Tzc and CTE slope. The conditions of the higher temperature annealing process (e.g. elevated temperature, intermediate temperature and rate of cooling) are shown to have primary influence over CTE slope, while the conditions of the lower temperature annealing process (e.g. intermediate temperature, annealing endpoint temperature, and rate of cooling) are shown to have little effect on CTE slope. The conditions of the higher temperature annealing process also influence Tzc, but only in a way, as described hereinabove, that is correlated with the influence on CTE slope. The conditions of the lower temperature annealing process, in contrast, permit control over Tzc independent of CTE slope.

For a given CTE slope, utilization of the controlled anneals of the present disclosure permits tuning of Tzc for a silica-titania glass of fixed composition over a much wider range than is possible with the prior art secondary anneal. Similarly, for a given Tzc, the present method permits tuning of CTE slope for a silica-titania glass of fixed composition over a much wider range than is possible with the prior art secondary anneal. The tunability in Tzc and CTE slope achievable with the present methods has heretofore only been possible through variations in glass composition. With the present methods, the need to prepare separate boules of varying composition to achieve targeted Tzc and CTE slope values is avoided and a single boule of fixed composition may be employed instead. Boules of a fixed composition may be prepared by a standardized process and subjected to controlled anneals of the present disclosure to provide boules spanning a wide range of Tzc and CTE slope values. Individual boules may be customized to applications requiring targeted Tzc and CTE slope values, where the range of potential Tzc and CTE values is wide and the range of potential applications is correspondingly diverse. Alternatively, blanks extracted from a single boule of uniform composition may be subjected to the controlled anneals of the present disclosure to provide glass articles having a range of Tzc and CTE slope values.

The methods of the present disclosure may transform a glass article having an initial zero-crossover temperature (Tzc,0) and an initial CTE slope (α',0) to a finished glass article having a final zero-crossover temperature (Tzc,f) and a final CTE slope (α',f). The zero-crossover temperature of the finished glass article may differ from the initial zero-crossover temperature, while the CTE slope of the finished glass article may or may not differ from the initial CTE slope. Alternatively, the CTE slope of the finished glass article may differ from the initial CTE slope, while the zero-crossover temperature of the finished glass article may or may not differ from the initial zero-crossover temperature.

The zero-crossover temperature of the finished glass article may differ from the initial zero-crossover temperature by at least 2° C., or at least 5° C., or at least 8° C., or at least 12° C., or at least 16° C., or at least 20° C.

The CTE slope of the finished glass article may differ from the initial CTE slope by at least 0.05 ppb/$K^2$, or at least 0.10 ppb/$K^2$, or at least 0.15 ppb/$K^2$, or at least 0.20 ppb/$K^2$, or at least 0.25 ppb/$K^2$.

The zero-crossover temperature of the finished glass article may differ from the initial zero-crossover temperature by at least 2° C. and the CTE slope at 20° C. of the finished glass article may differ from the initial CTE slope at 20° C. by less than 0.10 ppb/$K^2$, or less than 0.07 ppb/$K^2$, or less than 0.05 ppb/$K^2$, or less than 0.03 ppb/$K^2$. The zero-crossover temperature of the finished glass article may differ from the initial zero-crossover temperature by at least 5° C. and the CTE slope at 20° C. of the finished glass article may differ from the initial CTE slope at 20° C. by less than 0.10 ppb/$K^2$, or less than 0.07 ppb/$K^2$, or less than 0.05 ppb/$K^2$, or less than 0.03 ppb/$K^2$. The zero-crossover temperature of the finished glass article may differ from the initial zero-crossover temperature by at least 8° C. and the CTE slope at 20° C. of the finished glass article may differ from the initial CTE slope at 20° C. by less than 0.10 ppb/$K^2$, or less than 0.07 ppb/$K^2$, or less than 0.05 ppb/$K^2$, or less than 0.03 ppb/$K^2$. The zero-crossover temperature of the finished glass article may differ from the initial zero-crossover temperature by at least 12° C. and the CTE slope at 20° C. of the finished glass article may differ from the initial CTE slope at 20° C. by less than 0.10 ppb/$K^2$, or less than 0.07 ppb/$K^2$, or less than 0.05 ppb/$K^2$, or less than 0.03 ppb/$K^2$. The zero-crossover temperature of the finished glass article may differ from the initial zero-crossover temperature by at least 16° C. and the CTE slope at 20° C. of the finished glass article may differ from the initial CTE slope at 20° C. by less than 0.10 ppb/$K^2$, or less than 0.07 ppb/$K^2$, or less than 0.05 ppb/$K^2$, or less than 0.03 ppb/$K^2$. The zero-crossover temperature of the finished glass article may differ from the initial zero-crossover temperature by at least 20° C. and the CTE slope at 20° C. of the finished glass article may differ from the initial CTE slope at 20° C. by less than 0.10 ppb/$K^2$, or less than 0.07 ppb/$K^2$, or less than 0.05 ppb/$K^2$, or less than 0.03 ppb/$K^2$.

The CTE slope at 20° C. of the finished glass article may differ from the initial CTE slope at 20° C. by at least 0.05 ppb/$K^2$ and the zero-crossover temperature of the finished glass article may differ from the initial zero-crossover temperature by less than 5° C., or less than 3° C., or less than 1° C. The CTE slope at 20° C. of the finished glass article may differ from the initial CTE slope at 20° C. by at least 0.10 ppb/$K^2$ and the zero-crossover temperature of the finished glass article may differ from the initial zero-crossover temperature by less than 10° C., or less than 5° C., or less than 3° C. The CTE slope at 20° C. of the finished glass article may differ from the initial CTE slope at 20° C. by at least 0.15 ppb/$K^2$ and the zero-crossover temperature of the finished glass article may differ from the initial zero-crossover temperature by less than 15° C., or less than 10° C., or less than 5° C. The CTE slope at 20° C. of the finished glass article may differ from the initial CTE slope at 20° C. by at least 0.20 ppb/$K^2$ and the zero-crossover temperature of the finished glass article may differ from the initial zero-crossover temperature by less than 20° C., or less than 15° C., or less than 10° C.

The ability to independently control CTE slope and Tzc means that the present annealing methods can vary CTE slope and Tzc in an uncorrelated manner. The range of variations in CTE slope and Tzc for a fixed glass composition is not constrained by a correlation such as the one shown in FIG. 3. Instead, variations of CTE slope and Tzc from initial values to arbitrary values is possible. Whereas prior art annealing schedules permit transformations of CTE slope and Tzc among the different points along a correlation such as the one shown in FIG. 3, the annealing schedules of the present disclosure permit transformations of CTE slope and Tzc from a point on a prior art correlation such as the one shown in FIG. 3 to a point off of the prior art correlation, or from a point off of a prior art correlation to a point on a prior art correlation, or from one point off of a prior art correlation to a different point off of a prior art correlation.

Figure 4:
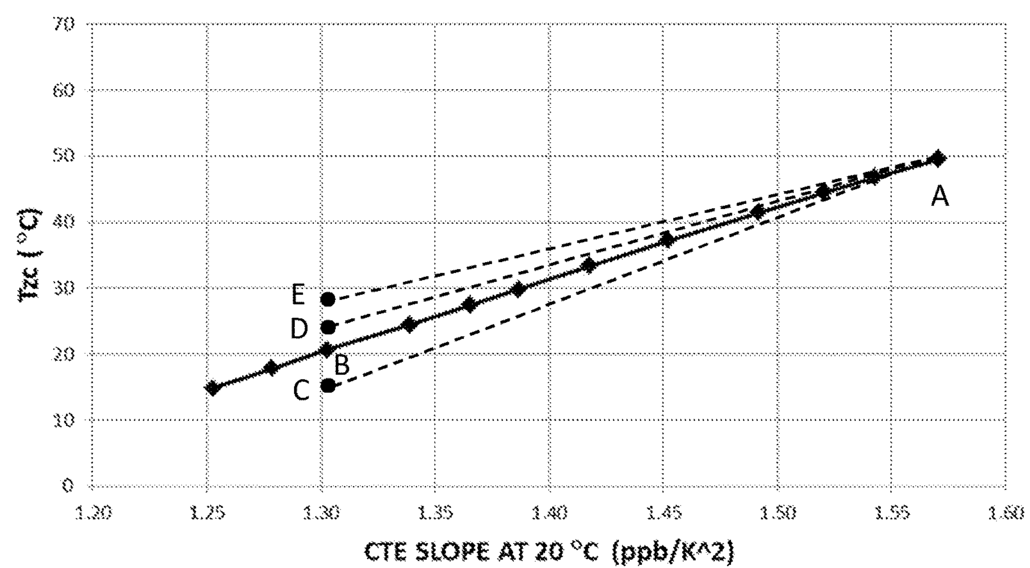
FIG. 4 compares correlated CTE slope and Tzc values available for a glass with a fixed composition from the annealing schedule of the prior art with uncorrelated CTE slope and Tzc values available from the present annealing schedules.

FIG. 4 repeats the correlated Tzc and CTE slope values shown in FIG. 3 and includes additional uncorrelated Tzc and CTE slope values for a glass having the same composition. As described hereinabove, the correlated Tzc and CTE slope values result from employing annealing schedules according to the prior art. Uncorrelated Tzc and CTE slope values refer to states described by points that do not lie on the correlation shown with the solid line. Uncorrelated Tzc and CTE slope values are available from the annealing schedules of the present disclosure. Point A shown in FIG. 4 represents a glass with Tzc and CTE slope values on the correlation. The glass represented by point A has a CTE slope of 1.57 ppb/$K^2$ and a Tzc of 50° C. If the application for which the glass is needed required a CTE slope of approximately 1.30 ppb/$K^2$, annealing according to the prior art schedule would provide the glass represented by point B in FIG. 4. Because Tzc correlates with CTE slope, the glass necessarily would have a Tzc of 20° C. If a Tzc other than 20° C. were required for the application, the glass would be unsuitable.

Annealing according to the present methods permits transformation of the glass represented by point A to multiple states spanning a range of Tzc values for a target value of CTE slope. If a glass with a CTE slope of 1.30 ppb/$K^2$ is desired, the present annealing methods can not only provide the glass with Tzc=20° C. represented by point B available from the prior art annealing methods, but also glasses with Tzc values above or below 20° C. Glasses represented by points C, D, and E shown in FIG. 4 schematically depict the tunability in Tzc available from methods of the present disclosure. The dotted lines illustrate transformations of the glass represented by point A to points C, D, E, and F and exemplify the lack of correlation between CTE slope and Tzc using the methods of the present disclosure. Analogous tunability is available for glasses having any CTE slope value, including glasses having a CTE slope less than 1.70 ppb/$K^2$, or less than 1.60 ppb/$K^2$, or less than 1.50 ppb/$K^2$, or less than 1.40 ppb/$K^2$, or less than 1.30 ppb/$K^2$, or between 1.25 ppb/$K^2$ and 1.65 ppb/$K^2$.

Figure 5:
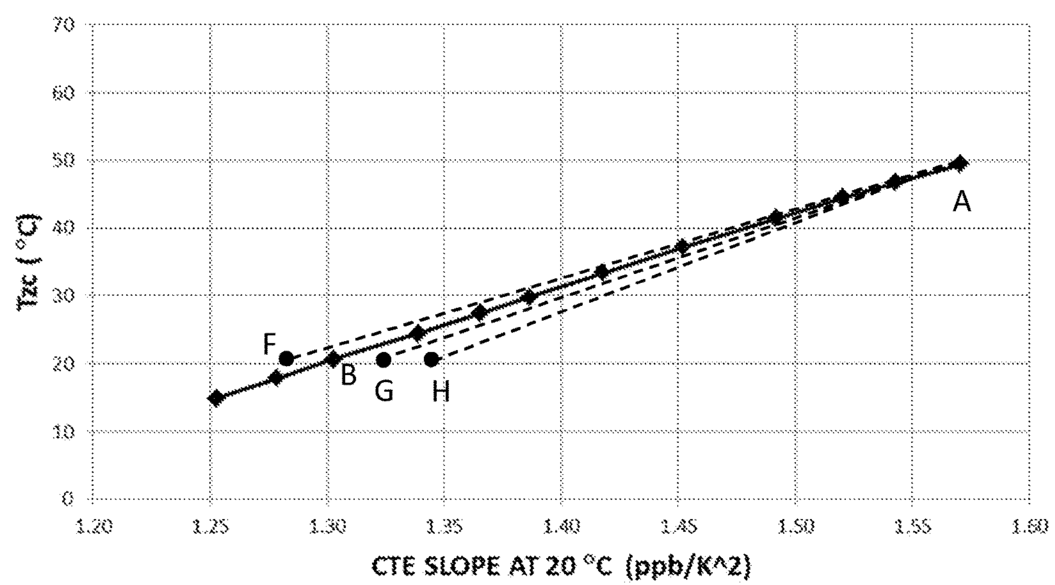
FIG. 5 compares correlated CTE slope and Tzc values available for a glass with a fixed composition from the annealing schedule of the prior art with uncorrelated CTE slope and Tzc values available from the present annealing schedules.

FIG. 5 shows a similar schematic tunability in CTE slope available from the methods of the present disclosure. If a Tzc of 20° C. is desired for a glass represented by point A, the methods of the present disclosure are not limited to providing a glass with the correlated CTE slope represented by point B. Instead, methods of the present disclosure can provide a glass with Tzc=20° C. with CTE slope values spanning a wide range, such as those illustrated by points F, G, and H in FIG. 5. Analogous tunability is available for glasses having any Tzc value, including glasses having a Tzc greater than 10° C., or greater than 20° C., or greater than 30° C., or greater than 40° C., or greater than 50° C., or between 10° C. and 50° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope less than or equal to 1.30 ppb/$K^2$ and a Tzc of at least 22° C., or at or at least 24° C., or at least 26° C., or at least 28° C., or at least 30° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope less than or equal to 1.40 ppb/$K^2$ and a Tzc of at least 32° C., or at least 34° C., or at least 36° C., or at least 38° C., or at least 40° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope less than or equal to 1.50 ppb/$K^2$ and a Tzc of at least 42° C., or at least 44° C., or at least 46° C., or at least 48° C., or at least 50° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope greater than or equal to 1.25 ppb/$K^2$ and a Tzc of or less than 14° C., or less than 12° C., or less than 10° C., or less than 8° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope greater than or equal to 1.35 ppb/$K^2$ and a Tzc of or less than 24° C., or less than 22° C., or less than 20° C., or less than 18° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope greater than or equal to 1.45 ppb/$K^2$ and a Tzc of or less than 36° C., or less than 34° C., or less than 32° C., or less than 30° C.

The glass may have a composition of 7.9 wt % $TiO_2$-92.0 wt % $SiO_2$ and conform to the correlation shown in FIG. 3. The initial state of the glass may have a CTE slope of 1.60 ppb/$K^2$ and a Tzc in accordance with the correlation shown in FIG. 3 (~52° C.) and the final state of the glass may have a CTE slope greater than or equal to 1.55 ppb/$K^2$ and a Tzc of or less than 46° C., or less than 44° C., or less than 42° C., or less than 40° C.

As noted hereinabove, the correlation shown in FIG. 3 corresponds to a particular titania-silica glass composition, including ~850 ppm OH. Corresponding correlations exist for other titania-silica glass compositions and are generally parallel to the correlation shown in FIG. 3. Departures from such correlations analogous to those described herein for the correlation shown in FIG. 3 are within the scope of the present methods.

Although FIGS. 4 and 5 illustrate aspects of the present disclosure with a glass having an initial state represented by a point (point A) on the correlation of the prior art, the present methods are not so limited. The present methods may transform glasses having initial states not on the correlation of the prior art to glasses having final states represented by points either on or off of the correlation of the prior art. A glass having an initial state represented by point H of FIG. 5, for example, may be transformed to a final state represented by point E of FIG. 4 (or vice versa). Transformations available from the present annealing methods may thus induce changes in both Tzc and CTE slope of the glass such that the Tzc and CTE slope of the final state of the glass both differ appreciably from the Tzc and CTE slope of the initial state of the glass. One or both of the differences between the final Tzc and initial Tzc and the final CTE slope and the initial CTE slope may differ from the corresponding difference represented by the correlation obtained from the annealing method of the prior art.

The prior art correlation shown in FIG. 3 is essentially linear with a slope of 107° C./(ppb/$K^2$), where slope is defined as the ratio of the difference between Tzc and the difference between CTE slope for two points on the correlation. Methods of the present disclosure provide tunability such that the ratio of the difference between Tzc and the difference between CTE slope for the initial and final states is greater than 107° C./(ppb/$K^2$) (e.g. the transformation between points C and A of FIG. 4) or less than 107° C./(ppb/$K^2$) (e.g. the transformation between points D and A of FIG. 4), The methods of the present disclosure further extend to implementation of the lower temperature anneal disclosed herein independent of the higher temperature anneal disclosed herein. A glass article may be fabricated and subjected to the lower temperature anneal described herein without be subjected to the higher temperature anneal described herein. A glass article may be fabricated, subjected to a standard initial anneal, and then subjected to the lower temperature anneal described herein without be subjected to the higher temperature anneal described herein. Implementation of the lower temperature anneal may include heating to the intermediate temperature, cooling to the annealing endpoint temperature at a rate as disclosed hereinabove, and cooling below the annealing endpoint at a rate as disclosed herein. The intermediate temperature may be as disclosed hereinabove. The intermediate temperature may be selected to be a temperature below the fictive temperature of the glass article. The intermediate temperature may be in the range from 60° C. below the fictive temperature to 10° C. below the fictive temperature, or in the range from 50° C. below the fictive temperature to 20° C. below the fictive temperature, or in the range from 40° C. below the fictive temperature to 20° C. below the fictive temperature. The heating to the intermediate temperature may exclude exposing the glass article to a temperature greater than the fictive temperature of the glass articles. By selecting the intermediate temperature to be below the fictive temperature of the glass article and avoiding exposure of the glass article to a temperature above its fictive temperature, implementation of the lower temperature anneal disclosed herein in the absence of the higher temperature anneal disclosed herein may permit refinement of Tzc without influencing CTE slope or fictive temperature.

The annealing endpoint temperature may be at least 25° C. less than the intermediate temperature, or at least 50° C. less than the intermediate temperature, or at least 100° C. less than the intermediate temperature.

The rate of cooling from the intermediate temperature to the annealing endpoint temperature may be less than 300° C./hr, or less than 200° C./hr, or less than 100° C./hr, or less than 50° C./hr, or less than 25° C./hr, or less than 10° C./hr, or less than 5° C./hr, or less than 1° C./hr, or less than 0.5° C./hr, or less, or between 0.1° C./hr and 300° C./hr, or between 0.5° C./hr and 100° C./hr, or between 1.0° C./hr and 50° C./hr, or between 2.0° C./hr and 25° C./hr, or between 2.0° C./hr and 20° C./hr, or between 2.0° C./hr and 15° C./hr, or between 2.0° C./hr and 10° C./hr. The cooling below the annealing endpoint temperature may include cooling to at least 50° C. below the annealing endpoint temperature, or at least 100° C. below the annealing endpoint temperature, or at least 200° C. below the annealing endpoint temperature.

When implementing the lower temperature anneal in the absence of the higher temperature anneal, the glass may be transformed from an initial state having an initial fictive temperature and an initial Tzc to a finished glass article having a final state with a final fictive temperature and a final Tzc. The final fictive temperature may differ from the initial fictive temperature by less than 10° C., or less than 5° C., or less than 2° C., or less than 1° C., or less than 0.5° C., or less than 0.25° C. The variation in fictive temperature throughout the process of transforming the glass from the initial state to the final state may be less than 2° C., or less than 1° C., or less than 0.5° C., or less than 0.25° C. The final Tzc may differ from the initial Tzc by at least 0.25° C., or at least 0.5° C., or at least 1.0° C., or at least 2.0° C., or at least 4.0° C., or at least 6.0° C., or at least 8.0° C., or at least 10.0° C. The final fictive temperature may differ from the initial fictive temperature by less than 10° C., or less than 5° C., or less than 2° C., or less than 1° C., or less than 0.5° C., or less than 0.25° C. and the variation in fictive temperature throughout the process of transforming the glass from the initial state to the final state may be less than 2° C., or less than 1° C., or less than 0.5° C., or less than 0.25° C. and the final Tzc may differ from the initial Tzc by at least 0.25° C., or at least 0.5° C., or at least 1.0° C., or at least 2.0° C., or at least 4.0° C., or at least 6.0° C., or at least 8.0° C., or at least 10.0° C.

Controlled anneals within the scope of the present disclosure provide silica-titania glasses having paired CTE slope and Tzc values that fall off the correlations dictated by prior art annealing methods. The tunability in CTE slope and Tzc available from the present methods for a given composition are unavailable from the prior art methods. In order to achieve the range of CTE slope and Tzc values from the prior art methods, it is necessary to vary the composition of the glass. As indicated hereinabove, variations in the titania content of silica-titania glass shift the CTE slope—Tzc correlation to produce composition-specific correlations that are generally parallel to the correlation shown in FIG. 3 for a glass having the composition 7.9 wt % $TiO_2$-92.0 wt % $SiO_2$. Compositional variations do afford control over CTE slope and Tzc, but are far less practical to implement than the annealing schedules of the present disclosure. The tunability in CTE slope and Tzc available from the present annealing schedules is equivalent to varying the titania content over a significant range.

Calculations of the titania content needed in a titania-silica glass to achieve representative Tzc values of interest in EUVL lithography applications were performed on glasses subjected to the standard initial anneal described hereinabove and subsequently subjected to secondary annealing according to the prior art or the annealing methods of the present disclosure. It may be desirable, for example, to have a glass with Tzc=25° C. and a CTE slope below 1.30 ppb/$K^2$. Silica-titania glasses meeting these specifications require a titania content greater than or equal to 7.95 wt % when prepared using prior art annealing methods. With anneals in accordance with the present disclosure, silica-titania glasses having a titania content in the range from 7.45 wt % to 8.03 wt % can be transformed to a final state having Tzc=25° C. and a CTE slope below 1.30 ppb/$K^2$. Silica-titania glasses having a titania content between 7.45 wt % and less than 7.95 wt % can thus be tuned with the present method, but not with the prior art method, to a final state having Tzc=25° C. and a CTE slope below 1.30 ppb/$K^2$.

Silica-titania glasses having Tzc=35° C. and CTE slope below 1.30 ppb/$K^2$ require a titania content greater than or equal to 8.13 wt % when prepared using prior art annealing methods. With anneals in accordance with the present disclosure, silica-titania glasses having a titania content in the range from 7.62 wt % to 8.20 wt % can be transformed to a final state having Tzc=35° C. and a CTE slope below 1.30 ppb/$K^2$. Silica-titania glasses having a titania content between 7.62 wt % and less than 8.13 wt % can thus be tuned with the present method, but not with the prior art method, to a final state having Tzc=35° C. and a CTE slope below 1.30 ppb/$K^2$.

Silica-titania glasses having Tzc=25° C. and CTE slope below 1.25 ppb/$K^2$ require a titania content greater than or equal to 8.07 wt % when prepared using prior art annealing methods. With anneals in accordance with the present disclosure, silica-titania glasses having a titania content in the range from 7.56 wt % to 8.14 wt % can be transformed to a final state having Tzc=25° C. and a CTE slope below 1.25 ppb/$K^2$. Silica-titania glasses having a titania content between 7.56 wt % and less than 8.07 wt % can thus be tuned with the present method, but not with the prior art method, to a final state having Tzc=25° C. and a CTE slope below 1.25 ppb/$K^2$.

Silica-titania glasses having Tzc=35° C. and CTE slope below 1.25 ppb/$K^2$ require a titania content greater than or equal to 8.23 wt % when prepared using prior art annealing methods. With anneals in accordance with the present disclosure, silica-titania glasses having a titania content in the range from 7.72 wt % to 8.30 wt % can be transformed to a final state having Tzc=35° C. and a CTE slope below 1.25 ppb/$K^2$. Silica-titania glasses having a titania content between 7.72 wt % and less than 8.23 wt % can thus be tuned with the present method, but not with the prior art method, to a final state having Tzc=35° C. and a CTE slope below 1.25 ppb/$K^2$.

The results also indicate that silica-titania glasses having a titania content in the range from 7.72 wt % to less than 8.03 wt % can be tuned with the methods of the present disclosure to any of the four illustrative conditions set forth above (1. Tzc=25° C. and CTE slope less than 1.30 ppb/$K^2$; 2. Tzc=35° C. and CTE slope less than 1.30 ppb/$K^2$; 3. Tzc=25° C. and CTE slope less than 1.25 ppb/$K^2$; 4. Tzc=35° C. and CTE slope less than 1.25 ppb/$K^2$). Any of the four conditions can be achieved within the composition window without a need to modify the conditions of the glass forming process. Post-formation annealing treatments in accordance with the present disclosure provide the tunability necessary within the composition window to achieve final states meeting any of the four illustrative conditions.

The present annealing treatments provide tunability of Tzc and CTE slope over wide ranges. In one embodiment, the annealing conditions can be adjusted to provide a silica-titania glass having a titania content between 7.45 wt % and 8.39 wt %, where the glass has Tzc in the range from 15° C. to 45° C. and a CTE slope at 20° C. below 1.30 ppb/$K^2$. The glass may also include OH. The concentration of OH in the glass may be in the range from 700 ppm to 1000 ppm.

In another embodiment, the annealing conditions can be adjusted to provide a silica-titania glass having a titania content between 7.45 wt % and 8.31 wt %, where the glass has Tzc in the range from 25° C. to 45° C. and a CTE slope at 20° C. below 1.30 ppb/$K^2$. The glass may also include OH. The concentration of OH in the glass may be in the range from 700 ppm to 1000 ppm. The annealing conditions may also be adjusted to provide a silica-titania glass having Tzc in the range from 25° C. to 45° C. and a CTE slope at 20° C. below 1.30 ppb/$K^2$, where the titania content is between 7.45 wt % and [7.95 wt %+(Tzc-25° C.)*(0.018 wt %/° C.)]. The glass may also include OH. The concentration of OH in the glass may be in the range from 700 ppm to 1000 ppm.

In still another embodiment, the annealing conditions can be adjusted to provide a silica-titania glass having a titania content between 7.56 wt % and less than 8.39 wt %, where the glass has Tzc in the range from 25° C. to 45° C. and a CTE slope at 20° C. below 1.25 ppb/$K^2$. The glass may also include OH. The concentration of OH in the glass may be in the range from 700 ppm to 1000 ppm. The annealing conditions may also be adjusted to provide a silica-titania glass having Tzc in the range from 25° C. to 45° C. and a CTE slope at 20° C. below 1.25 ppb/$K^2$, where the titania content is between 7.56 wt % and [8.07 wt %+(Tzc-25° C.)*(0.016 wt %/° C.)]. The glass may also include OH. The concentration of OH in the glass may be in the range from 700 ppm to 1000 ppm.

In yet another embodiment, the annealing conditions can be adjusted to provide a silica-titania glass having a titania content between 7.62 wt % and 8.13 wt %, where the glass has Tzc in the range from 25° C. to 35° C. and a CTE slope at 20° C. below 1.30 ppb/$K^2$. The glass may also include OH. The concentration of OH in the glass may be in the range from 700 ppm to 1000 ppm. The annealing conditions may also be adjusted to provide a silica-titania glass having Tzc in the range from 25° C. to 35° C. and a CTE slope at 20° C. below 1.30 ppb/$K^2$, where the titania content is between 7.62 wt % and [7.95 wt %+(Tzc-25° C.)*(0.018 wt %/° C.)]. The glass may also include OH. The concentration of OH in the glass may be in the range from 700 ppm to 1000 ppm.

In a further embodiment, the annealing conditions can be adjusted to provide a silica-titania glass having a titania content between 7.72 wt % and 8.23 wt %, where the glass has Tzc in the range from 25° C. to 35° C. and a CTE slope at 20° C. below 1.30 ppb/$K^2$. The glass may also include OH. The concentration of OH in the glass may be in the range from 700 ppm to 1000 ppm. The annealing conditions may also be adjusted to provide a silica-titania glass having Tzc in the range from 25° C. to 35° C. and a CTE slope at 20° C. below 1.25 ppb/$K^2$, where the titania content is between 7.72 wt % and [8.07 wt %+(Tzc-25° C.)*(0.016 wt %/° C.)]. The glass may also include OH. The concentration of OH in the glass may be in the range from 700 ppm to 1000 ppm.

The tunability extends as well as to many other final state combinations of Tzc and CTE slope not explicitly identified, but nonetheless readily appreciated by those of skill in the art. It is also a feature of the annealing treatments disclosed herein that they achieve the results while keeping the run length approximately constant. This is advantageous for planning at the glass production plant.

Example 1

Figure 6:
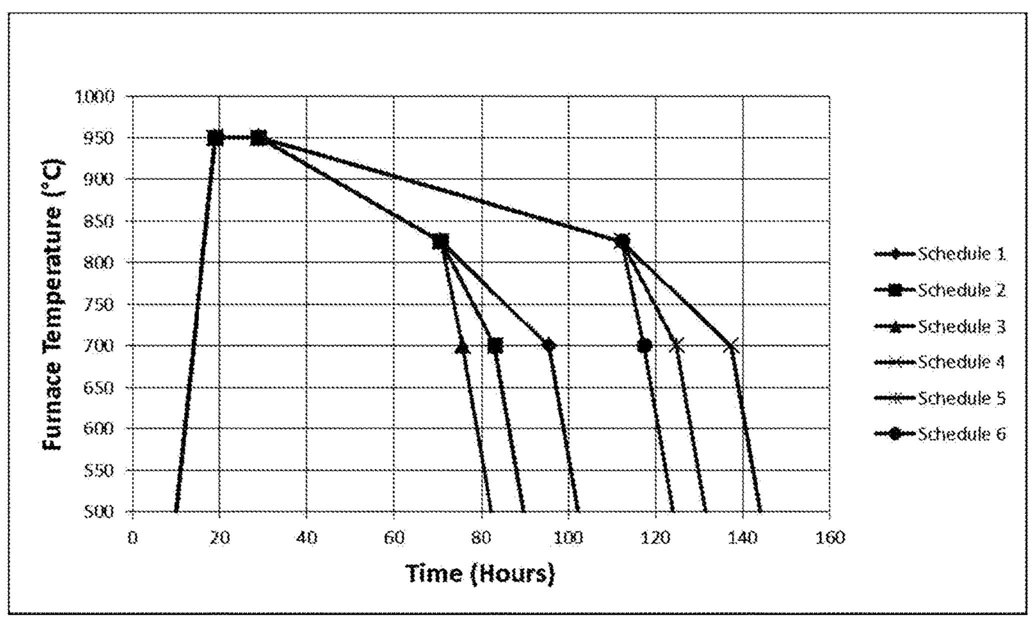
FIG. 6 shows representative annealing schedules that permit independent control of Tzc and CTE slope.

FIG. 6 illustrates representative annealing schedules in accordance with the present disclosure. Six annealing schedules are depicted. Each annealing schedule includes heating to an elevated temperature of 950° C. and holding at 950° C. for several hours. Annealing schedules 1-3 include a common rate of cooling from 950° C. to an intermediate temperature of 825° C. and differ in the rate of cooling from 825° C. to an annealing endpoint temperature of 700° C. Annealing schedules 4-6 include a common rate of cooling from 950° C. to an intermediate temperature of 825° C. and differ in the rate of cooling from 825° C. to an annealing endpoint temperature of 700° C. The rate of cooling between 950° C. and 825° C. differs for annealing schedules 1-3 and annealing schedules 4-6. The cooling rate below 700° C. to room temperature is the same for annealing schedules 1-6.

Although not explicitly shown, several additional annealing schedules of the type shown in FIG. 6 were devised with the same initial heating and holding conditions, the same elevated temperature (950° C.), the same intermediate temperature (825° C.), the same annealing endpoint temperature (700° C.), and the same cooling rate below the annealing endpoint temperature to room temperature. The additional annealing schedules differed in the rates of cooling between 950° C. and 825° C. and/or between 825° C. and 700° C.

Figure 7:
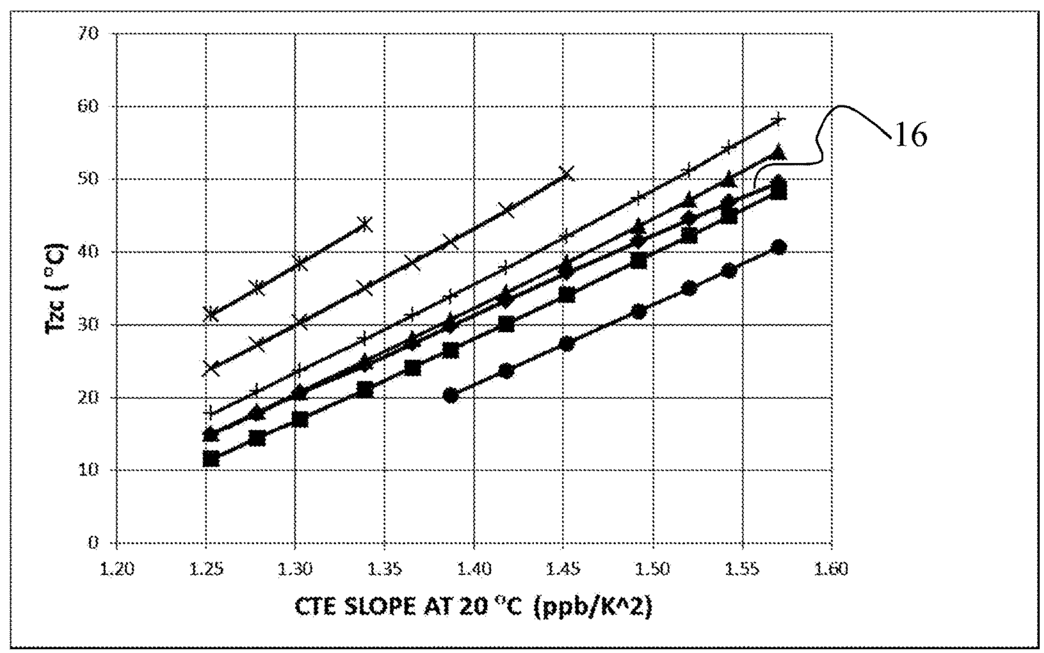
FIG. 7 shows variations in Tzc and CTE slope for glass samples subjected to annealing schedules in accordance with the present disclosure.

Calculated values of CTE slope at 20° C. and Tzc for a silica-titania glass with the composition 7.9 wt % $TiO_2$-92.0 wt % $SiO_2$ are presented in FIG. 7. The calculations were based on anneals of the type shown in FIG. 6. FIG. 7 also reproduces as trace 16 the data shown in FIG. 3. The calculated data segregate into a series of approximately linear traces, where the data points of each trace are connected by line segments as shown. The temperature schedule for each set of connected data points included a different rate of cooling between the elevated temperature (950° C.) and intermediate temperature (825° C.) of the anneal and a common rate of cooling between the intermediate temperature (825° C.) and annealing endpoint temperature (700° C.). Data points from different traces that align vertically were obtained from glass samples subjected to temperature schedules that included a common rate of cooling between the elevated temperature (950° C.) and intermediate temperature (825° C.) of the anneal and a different rate of cooling between the intermediate temperature (825° C.) and annealing endpoint temperature (700° C.).

The data shown in FIG. 7 demonstrate an ability to independently control Tzc and CTE slope of silica-titania glass with a fixed composition. For a particular CTE slope, it becomes possible with the present methods to obtain a range of Tzc values by varying the rate of cooling from the intermediate temperature to the annealing endpoint temperature. If a particular application, for example, requires a CTE slope of 1.25 ppb/$K^2$ for a silica-titania glass of a given composition, it becomes possible to tune Tzc over a temperature range of ~20° C. (e.g. from ~12° C. to ~32° C.) by controlling the cooling rate from the intermediate temperature to the annealing endpoint temperature. Using the annealing schedule of the prior art, in contrast, provides only a glass with Tzc of ~15° C. if a CTE slope of 1.25 ppb/$K^2$ is desired. Similarly, for a particular Tzc, it becomes possible with the present methods to obtain a range of CTE slope values by varying the rate of cooling between the elevated temperature and intermediate temperature and the rate of cooling between the intermediate temperature and the annealing endpoint temperature.

Glass samples subjected to annealing schedules 1-3 of FIG. 6 have a common cooling rate between the elevated temperature (950° C.) and the intermediate temperature (825° C.) and different cooling rates between the intermediate temperature (825° C.) and the annealing endpoint temperature (700° C.). Glass samples subjected to annealing schedules 1-3 of FIG. 6 thus have a common CTE slope and differing Tzc values. Data points for these samples align vertically in FIG. 7.

While not wishing to be bound by theory, it is believed that cooling in the temperature window of the first controlled anneal (between the elevated temperature and intermediate temperature) influences the fictive temperature of the glass article and that variations in the fictive temperature provide control over the CTE slope of the glass article. Tzc is also influenced in the temperature window of the first controlled anneal, but essentially only in a manner that correlates with the variation in CTE slope (consistent with the expected effects of the prior art anneal described hereinabove). It is also believed herein that cooling in the temperature window of the second controlled anneal (between the intermediate temperature and the annealing endpoint temperature) further influences the internal structure or physical state of the glass article. An underlying assumption associated with the prior art secondary annealing process is that the state of a silica-titania glass, including CTE slope and Tzc, are fixed upon cooling to a temperature of ~800° C. The presumption of the prior art secondary annealing process is that cooling in the temperature regime below ~800° C. has no substantive effect on the structure or properties of a silica-titania glass. The present disclosure, in contrast, demonstrates that cooling in the temperature regime below ~800° C. continues to influence the properties of silica-titania glasses. Cooling, for example, in the temperature range from ~800° C. to ~700° C. has been shown herein to influence Tzc with little or no influence on CTE slope. Although variations in Tzc occur in the prior art annealing process, they occur in conjunction with variations in CTE slope to provide correlated values of CTE slope and Tzc. Control of Tzc independent of CTE slope is a feature provided by the methods of the present disclosure that is unavailable from the methods of the prior art.

While not wishing to be bound by theory, it is believed that cooling in the lower temperature range associated with the second controlled anneal of the present disclosure influences a secondary fictive temperature of silica-titania glass. Like fictive temperature, it is believed that the secondary fictive temperature is an indicator of the internal structure, distribution of strains, or inhomogeneities of the glass. It is believed, however, that the time or length scales of the phenomena associated with the fictive temperature and secondary fictive temperature differ. It is further believed that the structural or relaxational phenomena associated with the fictive temperature and secondary fictive temperature are temperature dependent, but that the quenching temperature of the phenomena associated with the fictive temperature is higher than the quenching temperature of the phenomena associated with the secondary fictive temperature.

It is proposed herein that the structural and relaxational phenomena that establish the fictive temperature in silica-titania glass can be influenced during an annealing process through the selection of cooling rate in a temperature window above ~800° C. Below ~800° C., it is believed that the phenomena that establish the fictive temperature have quenched and become temperature insensitive. It is further proposed herein that while the structural and relaxational phenomena associated with the secondary fictive temperature may be influenced by the cooling rate above 800° C., they continue to be influenced by the cooling rate at temperatures below 800° C. The phenomena associated with the secondary fictive temperature may be influenced down to temperatures as low as about 650° C. It is believed that the phenomena that establish fictive temperature have primary control over CTE slope, while the phenomena that establish secondary fictive temperature have primary control over Tcz. Since the different phenomena that establish fictive and secondary temperature quench at different temperatures, it becomes possible to achieve independent control over CTE slope and Tcz as demonstrated herein.

Example 2

Figure 8:
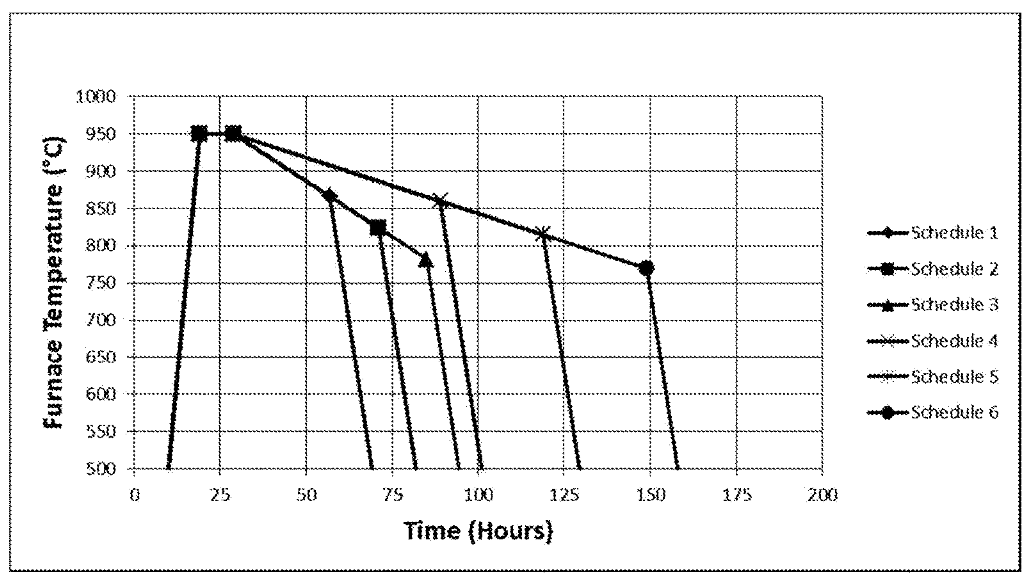
FIG. 8 shows alternative annealing schedules that permit independent control of Tzc and CTE slope.

FIG. 8 shows alternative annealing schedules that permit independent control of Tzc and CTE slope. Six representative annealing schedules are shown. Each annealing schedule includes heating to an elevated temperature of 950° C. and holding at 950° C. for several hours. Annealing schedules 1-3 include a common rate of cooling from 950° C. to different intermediate temperatures (~860° C., ~825° C., and ~780° C.) followed by cooling at a common faster rate to room temperature. Annealing schedules 4-6 include a common rate of cooling (different from the rate of cooling used for annealing schedules 1-3) from 950° C. to different intermediate temperatures (~855° C., ~815° C., and ~770° C.) followed by cooling at a common faster rate (the same faster rate as used in annealing schedules 1-3) to room temperature.

The common rate of cooling from the elevated temperature for annealing schedules 1-3 shown in FIG. 8 is expected to establish a common fictive temperature and a common CTE slope. Differences in the intermediate temperature are expected to lead to differences in Tzc and the postulated secondary fictive temperature described hereinabove. Similar conclusions hold for annealing schedules 4-6 shown in FIG. 8. The difference in the cooling rate from 950° C. for annealing schedules 1-3 relative to annealing schedules 4-6 in FIG. 8 is expected to lead to different CTE slopes.

To verify the trends expected for the annealing schedules shown in FIG. 8, tests were performed on a series of twelve glass samples extracted from a common boule of ULE® glass. The boule was not compositionally uniform and included regions exhibiting small variations in composition. The twelve samples were selected as two sets of six samples extracted from regions of the boule that differed slightly in composition. The set of six samples referred to as "Series 1" had a composition with 7.2 wt % $TiO_2$ and 92.7 wt % $SiO_2$ and the set of six samples referred to as "Series 2" had a composition with 7.5 wt % $TiO_2$ and 92.4 wt % $SiO_2$. OH content was about 850 ppm by weight in all samples. Each of the six Series 1 glass samples had an initial Tzc of 13° C. and an initial CTE slope of 1.60 ppb/$K^2$ and each of the six Series 2 glass samples had an initial Tzc of 24° C. and an initial CTE slope of 1.60 ppb/$K^2$.

Figure 9:
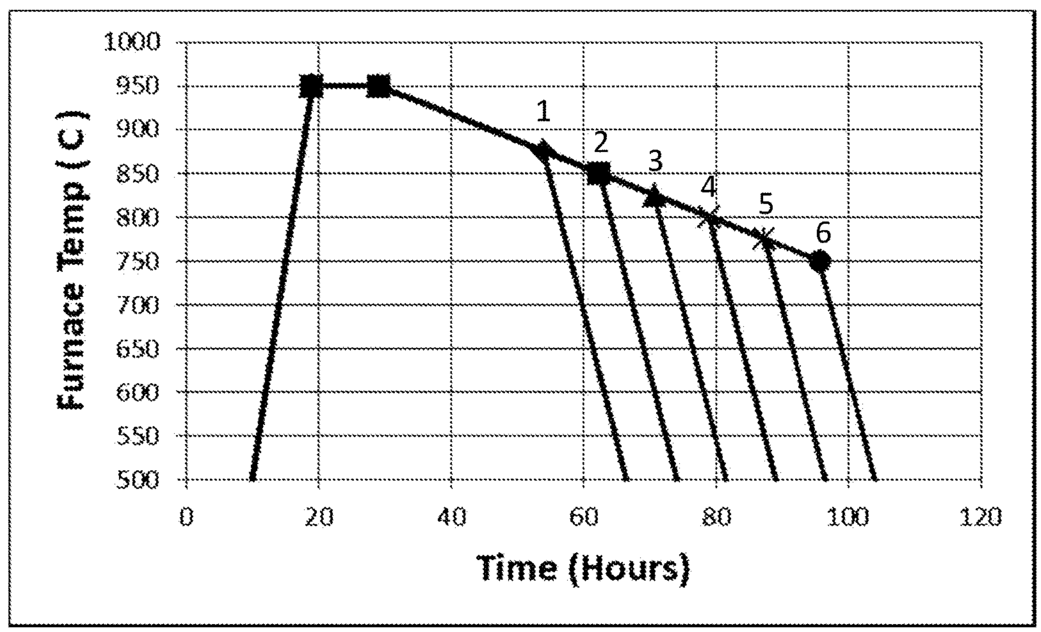
FIG. 9 shows annealing schedules of the type shown in FIG. 8 that were employed to test a series of six glass samples having a common composition.

The annealing schedules employed are shown in FIG. 9. Each annealing schedule included heating to an elevated temperature of 950° C., holding at 950° C. for several hours, cooling at a common rate to a particular intermediate temperature, and cooling at a common faster rate to room temperature. The intermediate temperature differed for the six annealing schedules. Six intermediate temperatures, ranging from 875° C. to 750° C., were employed. The six annealing schedules are labelled with an identifying number 1-6 in FIG. 9. Each sample within each series of six samples was subjected to a different one of the six annealing schedules. After completion of the annealing process, CTE slope at 20° C. and Tzc were measured for each of the samples. The fictive temperature (Tf) of each sample was also calculated using a well-established model.

Figure 10:
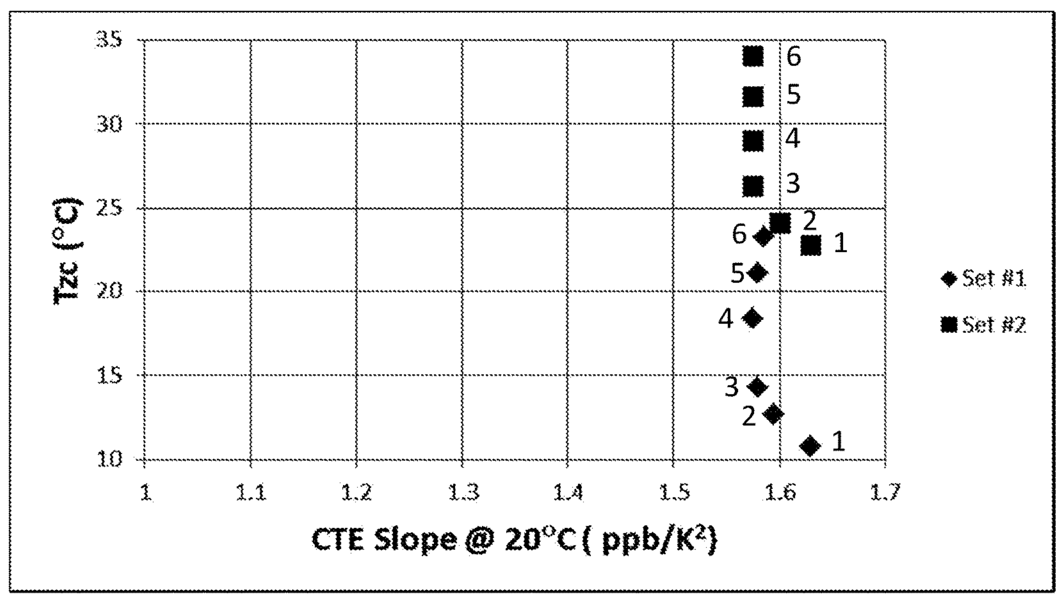
FIG. 10 shows Tzc and CTE slope data for glass samples treated with the annealing schedules of FIG. 9.

FIG. 10 shows Tzc and CTE slope for each of the twelve samples. The Series 1 data points correspond to the set of six samples having an initial Tzc of 13° C. and an initial CTE slope of 1.60 ppb/$K^2$, and the Series 2 data points correspond to the set of six samples having an initial Tzc of 24° C. and an initial CTE slope of 1.60 ppb/$K^2$. The annealing schedule associated with each data point is labeled according to the identifying number presented in FIG. 9. The data in FIG. 10 demonstrate that Tzc can be varied within each set of samples over a range of ~13° C. while maintaining an approximately constant CTE slope.

Figure 11:
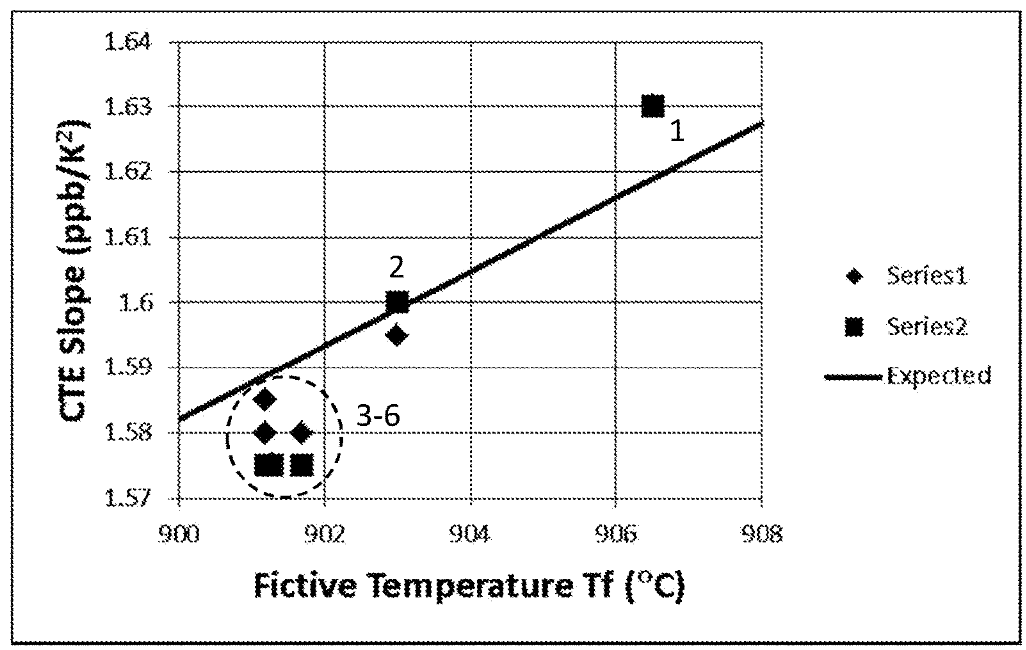
FIG. 11 shows CTE slope and fictive temperature data for glass samples treated with the annealing schedules of FIG. 9.

The most pronounced variability in CTE slope was observed for annealing schedule 1. The origin of the variability is believed to be due to a small variation of fictive temperature (Tf) that accompanied annealing schedule 1. Annealing schedule 1 had the highest intermediate temperature (875° C.) and was subjected to rapid cooling after a shorter cooling time at the slower cooling rate. It is believed that the fictive temperature of the glass composition was not fully established by 875° C. and that samples subjected to annealing schedule 1 accordingly had higher fictive temperatures. As the intermediate temperature of the annealing schedule was decreased, it is believed that the relaxational processes that establish fictive temperature fully quenched and that the fictive temperature stabilized accordingly. The correlation between CTE slope and fictive temperature shown in FIG. 11 is consistent with these expectations. The highest fictive temperature and largest CTE slope was observed for annealing schedule 1. Fictive temperature and CTE slope were observed to stabilize for annealing schedules 3-6. The range of variation of CTE slope over the set of six annealing schedules was observed to be ~0.05 ppb/$K^2$. Substantially smaller variations in CTE slope are expected for annealing schedules of the type shown in FIG. 6. For comparison purposes, in order to achieve the ~13° C. tuning range for Tzc observed for annealing schedules 1-6, the variation in CTE slope would be ~0.13 ppb/$K^2$ for conventional annealing schedules of the type shown in FIG. 2.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of annealing glass comprising:

providing a silica-titania glass article, said silica-titania glass article having a first Tzc and a first CTE slope at 20° C.;

heating said glass article to a first temperature, said first temperature being in the range from 900° C. and 950° C.;

cooling said glass article at a first rate from said first temperature to a second temperature, said second temperature being in the range from 800° C. to 850° C.;

cooling said glass article at a second rate from said second temperature to a third temperature, said second rate exceeding said first rate, said third temperature being in the range from 700° C. to 750° C.; and cooling said glass article at a third rate below said third temperature, said third rate exceeding said second rate, said cooling at said third rate producing a finished silica-titania glass article, said finished silica-titania glass article having a second Tzc and a second CTE slope at 20° C., said second Tzc differing from said first Tzc.

2. The method of claim 1, wherein said first cooling rate is in the range from 0.01° C./hour to 5.0° C./hour and said second cooling rate is in the range from 0.1° C./hour to 300° C./hour.

3. The method of claim 1, wherein said first cooling rate is in the range from 0.10° C./hour to 5.0° C./hour and said second cooling rate is in the range from 0.5° C./hour to 100° C./hour.

4. The method of claim 1, wherein said silica-titania glass article has a titania content in the range from 7 wt % to 12 wt %.

5. The method of claim 1, wherein said second Tzc differs from said first Tzc by at least 4° C. and said second CTE slope at 20° C. differs from said first CTE slope at 20° C. by less than 0.05 ppb/$K^2$.

6. The method of claim 1, wherein said second Tzc differs from said first Tzc by at least 2° C. and said second CTE slope at 20° C. differs from said first CTE slope at 20° C. by less than 0.03 ppb/$K^2$.

7. The method of claim 1, wherein said second Tzc differs from said first Tzc by at least 6° C. and said second CTE slope at 20° C. differs from said first CTE slope at 20° C. by less than 0.10 ppb/$K^2$.

8. The method of claim 1, wherein said silica-titania glass article has a titania content in the range from 7.5 wt % to 9 wt %.

9. The method of claim 1, wherein said silica-titania glass has an OH content in the range from 700 ppm to 1000 ppm.

10. A method of annealing glass comprising:

providing a silica-titania glass article, said silica-titania glass article having a first Tzc and a first CTE slope at 20° C.;

heating said glass article to a first temperature, said first temperature being higher than 850° C.;

cooling said glass article at a first rate from said first temperature to a second temperature, said second temperature being in the range from 750° C. to 875° C.;

cooling said glass article at a second rate from said second temperature to a third temperature, said second rate exceeding said first rate, said third temperature being in the range from 650° C. to 775° C.; and cooling said glass article at a third rate below said third temperature, said third rate exceeding said second rate, said cooling at said third rate producing a finished silica-titania glass article, said finished silica-titania glass article having a second Tzc and a second CTE slope at 20° C., said second Tzc differing from said first Tzc;

wherein said second Tzc differs from said first Tzc by at least 4° C. and said second CTE slope at 20° C. differs from said first CTE slope at 20° C. by less than 0.05 ppb/$K^2$.

11. The method of claim 10, wherein said first cooling rate is in the range from 0.01° C./hour to 5.0° C./hour and said second cooling rate is in the range from 0.1° C./hour to 300° C./hour.

12. The method of claim 10, wherein said first cooling rate is in the range from 0.10° C./hour to 5.0° C./hour and said second cooling rate is in the range from 0.5° C./hour to 100° C./hour.

13. The method of claim 10, wherein said silica-titania glass article has a titania content in the range from 7 wt % to 12 wt %.

14. The method of claim 10, wherein said first temperature is in the range from 900° C. and 950° C.

15. The method of claim 10, wherein said second temperature is in the range from 800° C. to 850° C.

16. The method of claim 10, wherein said third temperature is in the range from 700° C. to 750° C.

17. The method of claim 10, wherein said second Tzc differs from said first Tzc by at least 6° C. and said second CTE slope at 20° C. differs from said first CTE slope at 20° C. by less than 0.10 ppb/$K^2$.

18. The method of claim 10, wherein said silica-titania glass article has a titania content in the range from 7.5 wt % to 9 wt %.

19. The method of claim 10, wherein said silica-titania glass has an OH content in the range from 700 ppm to 1000 ppm.

* * * * *

UNITED STATES PATENT AND TRADEMARK OFFICE
CERTIFICATE OF CORRECTION

PATENT NO. : 9,890,071 B2
APPLICATION NO. : 15/291379
DATED : February 13, 2018
INVENTOR(S) : Carlos Alberto Duran It is certified that error appears in the above-identified patent and that said Letters Patent is hereby corrected as shown below:

In the Specification

In Column 1, Line 4, after "filed" insert -- on --.

Signed and Sealed this
Twenty-eighth Day of July, 2020

Andrei Iancu
*Director of the United States Patent and Trademark Office*